United States Patent
Lee

(10) Patent No.: US 12,120,165 B2
(45) Date of Patent: Oct. 15, 2024

(54) ADAPTIVE AUDIO PROCESSING METHOD, DEVICE, COMPUTER PROGRAM, AND RECORDING MEDIUM THEREOF IN WIRELESS COMMUNICATION SYSTEM

(71) Applicant: INTELLECTUAL DISCOVERY CO., LTD., Seoul (KR)

(72) Inventor: Jea Ho Lee, Cheongju-si (KR)

(73) Assignee: INTELLECTUAL DISCOVERY CO., LTD., Seoul (KR)

(*) Notice: Subject to any disclaimer, the term of this patent is extended or adjusted under 35 U.S.C. 154(b) by 76 days.

(21) Appl. No.: 17/628,051

(22) PCT Filed: Jul. 15, 2020

(86) PCT No.: PCT/KR2020/009323
§ 371 (c)(1),
(2) Date: Jan. 18, 2022

(87) PCT Pub. No.: WO2021/015484
PCT Pub. Date: Jan. 28, 2021

(65) Prior Publication Data
US 2022/0263883 A1      Aug. 18, 2022

(30) Foreign Application Priority Data

Jul. 19, 2019   (KR) .................. 10-2019-0087877

(51) Int. Cl.
*H04L 65/70*   (2022.01)
*G10L 19/00*   (2013.01)

(52) U.S. Cl.
CPC ............. *H04L 65/70* (2022.05); *G10L 19/00* (2013.01)

(58) Field of Classification Search
CPC ..... H04L 65/70; H04L 65/752; H04L 65/756; H04L 12/2805; H04L 12/2812; H04L 12/2849; H04L 41/509; G10L 19/00
(Continued)

(56) References Cited

U.S. PATENT DOCUMENTS

| 8,577,483 B2 * | 11/2013 | Oh ..................... G10L 19/008 |
| | | 700/94 |
| 9,251,795 B2 * | 2/2016 | Patel ..................... G10L 19/00 |

(Continued)

FOREIGN PATENT DOCUMENTS

| CN | 101322375 B | * 4/2012 | ........... G10L 19/167 |
| EP | 2 863 386 A1 | 4/2015 | |

(Continued)

OTHER PUBLICATIONS

Classification of audio codecs based on coding characteristics Samet Hiçsönmez; Hüsrev T. Sencar; Ismail Avcibaş 2012 20th Signal Processing and Communications Applications Conference (SIU) Year: 2012 | Conference Paper | Publisher: IEEE (Year: 2012).*

(Continued)

*Primary Examiner* — Melvin H Pollack
(74) *Attorney, Agent, or Firm* — Sughrue Mion, PLLC

(57) ABSTRACT

The present disclosure relates to an adaptive audio processing method, device, computer program, and recording medium thereof in a wireless communication system. A method of transmitting audio data from a first device to a second device in a wireless communication system, according to an embodiment of the present disclosure, may comprise: encoding first audio data in the first device, on the basis of a first codec parameter, to transmit same to the second device; transmitting, from the first device to the second device, information related to a change time point or (Continued)

a change position from the first codec parameter to second codec parameter; and encoding second audio data, on the basis of a second codec parameter, in the first device and transmitting same to the second device.

6 Claims, 26 Drawing Sheets

(58) Field of Classification Search
USPC .......................................................... 709/201
See application file for complete search history.

(56) References Cited

U.S. PATENT DOCUMENTS

| | | | | |
|---|---|---|---|---|
| 9,544,718 | B2* | 1/2017 | Song | H04L 65/1086 |
| 10,116,537 | B2* | 10/2018 | Kellicker | H04L 43/062 |
| 10,134,412 | B2* | 11/2018 | Mamola | G10L 19/22 |
| 10,148,391 | B2* | 12/2018 | Bruhn | G10L 19/00 |
| 10,177,965 | B1* | 1/2019 | Joshi | H04L 67/141 |
| 10,219,147 | B2* | 2/2019 | Johansson | H04W 8/22 |
| 10,229,694 | B2* | 3/2019 | Fischer | G10L 19/167 |
| 10,237,319 | B2* | 3/2019 | Schmidt | H04L 65/762 |
| 10,248,496 | B2* | 4/2019 | Kroeger | H04L 1/005 |
| 10,270,823 | B2* | 4/2019 | Stockhammer | H04L 67/02 |
| 10,339,947 | B2* | 7/2019 | Johnston | H04N 19/625 |
| 10,341,657 | B2* | 7/2019 | Phillips | H04L 65/70 |
| 10,388,287 | B2* | 8/2019 | Disch | G10L 19/02 |
| 10,438,597 | B2* | 10/2019 | Biswas | G10L 19/0017 |
| 10,531,095 | B2* | 1/2020 | Deen | H04N 19/177 |
| 10,652,121 | B2* | 5/2020 | Caron | H04L 43/20 |
| 10,687,122 | B2* | 6/2020 | Schmidmer | H04N 21/4425 |
| 10,693,642 | B1* | 6/2020 | Saxton | H04L 9/065 |
| 10,693,936 | B2* | 6/2020 | Stockhammer | H04N 21/44209 |
| 10,743,041 | B1* | 8/2020 | Weinraub | H04N 21/812 |
| 10,848,811 | B2* | 11/2020 | McGinn | H04L 69/22 |
| 10,873,780 | B2* | 12/2020 | Phillips | H04N 21/6373 |
| 10,911,512 | B2* | 2/2021 | Nielsen | H04N 21/21805 |
| 11,277,691 | B2* | 3/2022 | Girardier | H04W 56/001 |
| 11,562,764 | B2* | 1/2023 | Schmidt | G10L 19/02 |
| 11,832,241 | B2* | 11/2023 | Ferrari | H04R 25/552 |
| 11,990,141 | B2* | 5/2024 | Norvell | G10L 19/02 |
| 2011/0235702 | A1 | 9/2011 | O'Connell et al. | |
| 2013/0163584 | A1* | 6/2013 | Jayaraman | H04L 65/1036 370/352 |
| 2014/0241426 | A1* | 8/2014 | Fucci | H04N 19/895 375/E7.243 |
| 2014/0314155 | A1* | 10/2014 | Neff | H04L 65/1101 375/240.26 |
| 2014/0337038 | A1* | 11/2014 | Zhang | G10L 19/22 704/500 |
| 2015/0092575 | A1* | 4/2015 | Khay-Ibbat | H04L 65/65 370/252 |
| 2016/0360217 | A1 | 12/2016 | Wan et al. | |
| 2018/0151187 | A1* | 5/2018 | Sørensen | G10L 19/167 |
| 2018/0279050 | A1* | 9/2018 | Ryu | H04L 67/12 |
| 2023/0103916 | A1* | 4/2023 | Lee | H04L 65/762 455/41.2 |
| 2023/0132125 | A1* | 4/2023 | Moon | G10L 19/167 381/77 |
| 2023/0413348 | A1* | 12/2023 | Kim | H04L 5/06 |
| 2024/0045643 | A1* | 2/2024 | Ti | G10L 19/22 |

FOREIGN PATENT DOCUMENTS

| | | | | |
|---|---|---|---|---|
| KR | 10-2008-0075503 | A | 8/2008 | |
| KR | 10-1215615 | B1 | 12/2012 | |
| KR | 10-1809390 | B1 | 1/2018 | |
| WO | WO-2007066897 | A1 * | 6/2007 | ........... G10L 19/167 |
| WO | WO-2019000877 | A1 * | 1/2019 | ........... G10L 19/0019 |

OTHER PUBLICATIONS

Classification of audio codecs based on coding characteristics Samet Hiçsönmez; Hüsrev T. Sencar; Ismail Avcibaş 2012 20th Signal Processing and Communications Applications Conference (SIU) Year: 2012 | Conference Paper | Publisher: IEEE (Year: 2012) (Year: 2012).*

Extended European Search Report dated Feb. 20, 2023 issued in European Application No. 20844354.9.

International Search Report for PCT/KR2020/009323 dated for Oct. 13, 2020.

Written Opinion for PCT/KR2020/009323 dated for Oct. 13, 2020.

* cited by examiner

FIG.1
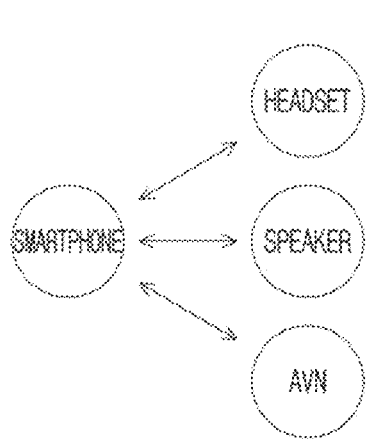
(a)
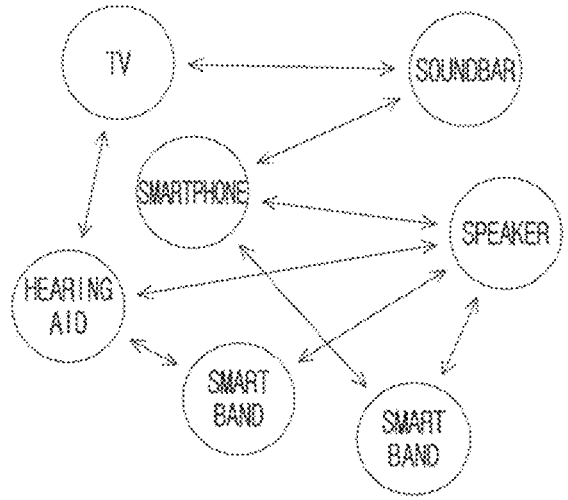
(b)

ADAPTIVE AUDIO PROCESSING METHOD, DEVICE, COMPUTER PROGRAM, AND RECORDING MEDIUM THEREOF IN WIRELESS COMMUNICATION SYSTEM

CROSS REFERENCE TO RELATED APPLICATIONS

This application is a National Stage of International Application No. PCT/KR2020/009323 filed Jul. 15, 2020, claiming priority based on Korean Patent Application No. 10-2019-0087877 filed Jul. 19, 2019.

TECHNICAL FIELD

The present disclosure relates to a method, an apparatus, a computer program, and a recording medium thereof for adaptive audio processing in a wireless communication system.

BACKGROUND ART

Bluetooth is a short-range wireless communication standard and includes BR (Basic Rate)/EDR (Enhanced Data Rate) technology and LE (Low Energy) technology. BR/EDR is also called Bluetooth classic, and includes BR technology applied from Bluetooth 1.0 and EDR technology applied from Bluetooth 2.0. Bluetooth LE (BLE) applied after Bluetooth 4.0 is a technology that supports transmission and reception of relatively large data with low power consumption.

The Bluetooth standard includes various profiles. For example, the Hands-Free Profile (HFP) defines what is necessary for one device to function as an audio gateway (AG) such as a smartphone and another device to function as a hands-free device such as a headset. In addition, A2DP (Advance Audio Distribution Profile) defines what is necessary for one device to function as an audio source such as a music player and another device to function as an audio sink such as a speaker.

As the spread of wireless devices increases recently, the demand for transmitting and receiving audio data in various topologies of many-to-many or M-to-N connection types is increasing. For example, streaming services that require a 5.1 channel environment are emerging, and it is being discussed to support a 5.1 channel environment using a plurality of Bluetooth portable speakers, breaking away from the limitations of a conventional 5.1 channel dedicated wired speaker. However, since the conventional Bluetooth audio technology was mainly developed in consideration of a use case of a one-to-one connection between two devices, it is not suitable for supporting audio data transmission/reception between multiple devices and delay is a big problem. In addition, as the number of Bluetooth audio devices increases, there is a problem in that power consumption for searching for peripheral devices increases.

In addition, the conventional Bluetooth audio codec does not support dynamically or seamlessly changing a codec parameter such as a bit rate, and does not support adaptively changing a codec parameter according to a surrounding situation. Accordingly, although a new Bluetooth audio codec (e.g., Bluetooth Low Energy Audio Codec (BLEAC)) is required to dynamically and/or adaptively change a codec parameter, a specific method for this is not provided.

DISCLOSURE

Technical Problem

A technical problem of the present disclosure is to support adaptive audio processing in a wireless communication system.

An additional technical problem of the present disclosure is to provide a method and an apparatus for dynamically and adaptively changing a codec parameter for audio processing based on a change in an external factor in a wireless communication system.

An additional technical problem of the present disclosure is to provide a method and an apparatus for performing seamlessly audio processing by a codec parameter that is changed based on a change in an external factor in a wireless communication system.

The technical problems to be achieved in the present disclosure are not limited to the technical problems mentioned above, and other technical problems not mentioned will be clearly understood by those of ordinary skill in the art to which the present disclosure belongs from the following description.

Technical Solution

According to an aspect of the present disclosure, a method for transmitting audio data from a first device to a second device in a wireless communication system may include encoding a first audio data in the first device based on a first codec parameter; transmitting the encoded first audio data from the first device to the second device; transmitting, from the first device to the second device, information related to a change time or change location from the first codec parameter to a second codec parameter; encoding a second audio data in the first device based on the second codec parameter; and transmitting the encoded second audio data from the first device to the second device.

According to an additional aspect of the present disclosure, a method for receiving audio data from a first device to a second device in a wireless communication system may include decoding a first audio data received from the first device based on a third codec parameter in the second device; rendering the decoded first audio data in the second device; receiving, from the first device, information related to a change time or a change location from a first codec parameter to a second codec parameter in the second device; decoding a second audio data received from the first device based on a fourth codec parameter in the second device; and rendering the decoded second audio data in the second device.

According to an additional aspect of the present disclosure, a device for transmitting audio data in a wireless communication system may include a transceiver for performing signal transmission and reception with another device; and a processor for controlling the transceiver and the device; and the processor may be configured to encode a first audio data based on a first codec parameter; transmit, through the transceiver, the encoded first audio data to the another device; transmit, through the transceiver, information related to a change time or change location from the first codec parameter to the second codec parameter to the another device; encode a second audio data based on a second codec parameter; and transmit, through the transceiver, the encoded second audio data to the another device.

According to an additional aspect of the present disclosure, a device for receiving audio data from another device in a wireless communication system may include a transceiver for performing signal transmission and reception with another device; and a processor for controlling the transceiver and the device; and the processor is configured to: decode a first audio data received from the another device based on a third codec parameter; render the decoded first audio data; receive, from the another device, information related to a change time or a change location from a first codec parameter to a second codec parameter; decode a second audio data received from the another device based on a fourth codec parameter; and render the decoded second audio data.

The features briefly summarized above with respect to the present disclosure are merely exemplary aspects of the detailed description of the present disclosure that follows, and do not limit the scope of the present disclosure.

Technical Effects

According to the present disclosure, adaptive audio processing in a wireless communication system may be supported.

According to the present disclosure, a method and an apparatus for dynamically and adaptively changing a codec parameter for audio processing based on a change in an external factor in a wireless communication system may be provided.

According to the present disclosure, a method and an apparatus for performing seamlessly audio processing by a codec parameter that is changed based on a change in an external factor in a wireless communication system may be provided.

The technical effects of the present disclosure are not limited to the above-described effects, and other effects not mentioned herein may be understood to those skilled in the art from the following description.

BRIEF DESCRIPTION OF DRAWINGS

FIG. 1 is a diagram exemplarily illustrating a conventional audio connection type and an audio connection type to which the present disclosure is applicable.

BEST MODE

Figure 2:
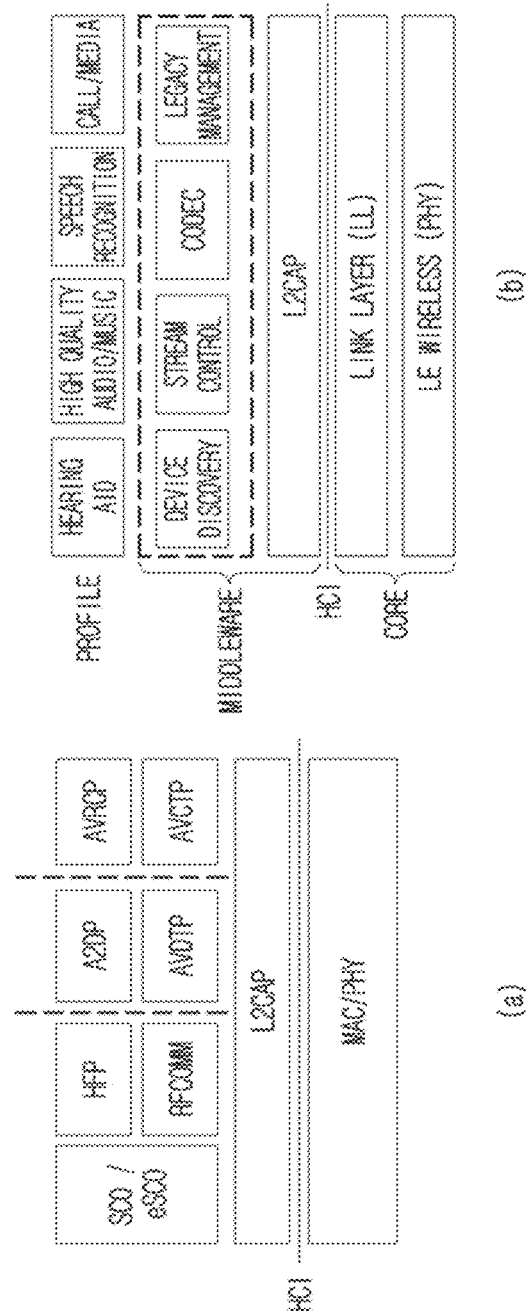
FIG. 2 is a diagram exemplarily illustrating a conventional audio-related protocol and an audio-related protocol stack to which the present is applicable.

Hereinafter, with reference to the accompanying drawings, embodiment of the present disclosure will be described in detail so that those of ordinary skill in the art to which the present disclosure belongs can easily implement them. However, the present disclosure may be embodied in several different forms and is not limited to the embodiments described herein.

In describing the embodiments of the present disclosure, if it is determined that a detailed description of a well-known configuration or function may obscure the gist of the present disclosure, a detailed description thereof will be omitted. And, in the drawings, parts not related to the description of the present disclosure are omitted, and similar reference numerals are attached to similar parts.

In the present disclosure, when a component is "connected", "coupled" or "accessed" to another component, it may include not only a direct connection relationship, but also an indirect connection relationship in which another component exists in the middle. Also, in the present disclosure, the terms "comprises" or "have" specify the presence of a recited feature, step, operation, element and/or component, but it does not exclude the presence or addition of one or more other features, steps, operations, elements, components and/or groups thereof.

In the present disclosure, terms such as "first" and "second" are used only for the purpose of distinguishing one component from other components and are not used to limit the components. And, unless otherwise noted, the terms do not limit the order or importance between the components. Accordingly, within the scope of the present disclosure, a first component in one embodiment may be referred to as a second component in another embodiment, and similarly, a second component in one embodiment may be referred to as a first component in another embodiment.

In the present disclosure, the components that are distinguished from each other are for clearly describing each characteristic, and do not necessarily mean that the components are separated. That is, a plurality of components may be integrated to form one hardware unit or a software unit, or one component may be distributed to form a plurality of hardware units or software units. Accordingly, even if not specifically mentioned, such integrated or dispersed embodiments are also included in the scope of the present disclosure.

The various embodiments of the present disclosure are not intended to list all possible combinations of components, but rather to illustrate representative aspects of the disclosure, and some or all of the components described in the various embodiments may be applied independently or in combination of two or more. That is, components described in various embodiments of the present disclosure do not necessarily mean essential components, and some may be optional components. Accordingly, an embodiment composed of a subset of components described in one embodiment is also included in the scope of the present disclosure. In addition, embodiments including other components in addition to components described in various embodiments are also included in the scope of the present disclosure.

Example methods of the present disclosure are expressed as a series of operations for clarity of description, but this is not intended to limit the order in which the steps are performed, and if necessary, each step may be performed simultaneously or in a different order. In addition, in order to implement the method according to the present disclosure, other steps may be included in addition to the illustrated steps, steps may be included except for some steps, or additional steps may be included except for some steps.

Terms used in the present disclosure is for the description of specific embodiments and is not intended to limit the claims. As used in the description of the embodiments and in the appended claims, the singular form is intended to include the plural form as well, unless the context clearly dictates otherwise. Also, the term "and/or" used in the present disclosure may refer to one of the related enumerations, or is meant to refer to and include all possible (or random) combinations of two or more thereof.

Definitions of terms used in the present disclosure are as follows.

An audio sink is an entity that receives audio data from an audio source.

An audio source is an entity that transmits audio data to the audio sink.

An audio channel is a single flow of coded or uncoded audio data.

An audio stream is a unidirectional logical communication channel that carries audio data flowing from the audio source to the audio sink. Audio data may flow on an audio stream session (ASS). An audio stream may carry audio data for one or more audio channels.

An audio group may include one or more synchronized audio streams.

A content type indicates a classification of content of an audio group. The classification may include whether the audio was initiated by the user. A content type indicates a classification of content of an audio group. The classification may include whether the audio was initiated by the user. Examples of the content type may include uncategorized audio (UncategorizedAudio), ringtone (Ringtone), system sound (SystemSound), satellite navigation (Satnav), call audio (CallAudio), media (Media), and the like.

Metadata is a variable-length data that describes and provides the context of audio data. Metadata may be defined for a higher layer.

An audio stream session (ASS) means to a unidirectional or bidirectional transmission/exchange process of an audio stream. An endpoint of an ASS corresponds to an audio input and/or audio output of an audio stream session, and may correspond to one device or a group of devices. The end of the ASS resides on the server and may be configured by the server or by the client. The server may store, change, and manage ASS state.

QoS (Quality of Service) means a quality of service for an audio stream and may correspond to a requirement for a specific service.

An audio location means a logical spatial rendering location intended for an audio channel within a spatial arrangement of a device for rendering audio. For example, the left and right location of a headset may correspond to an audio location. An audio location may be allocated to an audio channel.

CBIS (Connection Based Isochronous Stream) is a term defined in a core layer and is a concept corresponding to an audio stream in an ASS service. A unidirectional CBIS may have one audio stream, and a bidirectional CBIS may have two audio streams.

CBISS (Connection Based Isochronous Stream Set) is a term defined in a core layer and is a concept corresponding to an audio group in the ASS service.

An audio scene application (ASA) means an audio group performing a specific content type.

ASC (Audio Steam Capability) is a set of parameters necessary for configuring an audio session capability.

An audio advertisement is to discover the availability of ASA participation. An audio general advertisement is an audio advertisement that does not specify a target, and an audio directed advertisement is an audio advertisement for a specific target.

Isochronous data means data that is limited by time. For example, isochronous data may be time-dependent audio, such as television audio that needs to be synchronized with respect to an image of a video, or audio that needs to be synchronized and reproduced in multiple devices constituting a multi-channel.

An isochronous channel means a logical transmitting end used to transmit isochronous data from a transmitting device to one or more receiving devices.

An isochronous stream means a logical link carrying one or more isochronous channels.

FIG. 1 is a diagram exemplarily illustrating a conventional audio connection type and an audio connection type to which the present disclosure is applicable.

FIG. 1(a) illustrates an example of a BR/EDR audio connection type. In the case of BR/EDR, one-to-one connection type is supported. One device (e.g., a smartphone) may function as a central device, and may be connected one-to-one with each of several devices. That is, there may be multiple one-to-one connections. Accordingly, the service such as a phone call through a headset or music reproduction through a speaker may be supported. The center of service in this connection type is an audio source, and an audio sink such as a headset, a speaker, and AVN (Audio Video Navigation) may operate as a peripheral device of the audio source.

FIG. 1(b) illustrates an example of a BLE audio connection type. In the case of BLE, many-to-many connections may be supported. In this case, there may be a plurality of center devices such as a TV, a smart phone, and a gateway etc., and complex M-to-N connection may be configured. Accordingly, services of phone calls and music reproduction through the headset may be supported, and broadcast audio services such as alarms, doorbells, and advertising voices may be supported. The center of the service in this connection type is an audio sink, and the audio service may be used by moving multiple audio sources.

FIG. 2 is a diagram exemplarily illustrating a conventional audio-related protocol stack and an audio-related protocol stack to which the present disclosure is applicable.

FIG. 2 (a) illustrates an example of an audio-related protocol stack. L2CAP (Logical Link Control & Adaption Protocol) layer functions as arbitration and mediation between the upper layer and the lower layer. In the upper layer, protocols such as RFCOMM (Radio Frequency Communication), AVDTP (Audio/Video Distribution Transport Protocol), AVCTP (Audio/Video Control Transport Protocol) etc. and profiles such as HFP (Hands Free Profile), A2DP (Advanced Audio Distribution Profile), AVRCP (Audio/Video Remote Control Profile) etc. may be included. The lower layer may include a MAC/PHY layer. The MAC (Medium Access Control) layer may include a link manager and a link controller, and the PHY (Physical) layer may include a BR/EDR radio. In addition, Synchronous Connection Oriented (SCO)/extended SCO (eSCO) may provide a synchronous data communication path for voice. As such, in BR/EDR, a protocol stack may be designed for each profile. The L2CAP layer, the BR/EDR protocol, the Generic Access Profile (GAP), and the BR/EDR profile layer may be collectively referred to as the host layer, and the link manager, link controller, and BR/EDR radio layer may be referred to as the controller layer. The interface between the host and the controller may be referred to as a HCI (Host Controller Interface).

FIG. 2(b) illustrates an example of a BLE audio-related protocol stack. Unlike BR/EDR in which protocols are configured for each profile, in BLE, a common protocol stack for various profiles may be designed. This common protocol stack may be referred to as middleware. For example, a common protocol for various profiles such as hearing aids, high quality audio/music, voice recognition, and call/media in the form of middleware may be configured. For example, the middleware may include protocols such as device discovery, stream control (or stream management), codec, and legacy management. In addition, the core layer may include a link layer (Link Layer, LL), an LE Radio (i.e., a PHY layer), and the LL may include functions related to multicast support isochronous channels defined from Bluetooth 5.

In addition, the profile and middleware may be referred to as a host layer, the core layer may be referred to as a controller layer, and HCI may be defined between the host and the controller.

In addition to the host profile and protocol illustrated in FIG. 2(b), the host may include an LE profile, a generic access profile (GAP), a generic attribute profile (GATT), an Attribute (ATT) protocol, a security manager (SM), and the like.

Information transmitted from a host to a controller may be referred to as a HCI command packet. Information transmitted from a controller to a host may be referred to as a HCI event packet. In addition, HCI asynchronous data packets or HCI synchronous data packets may be exchanged between a host and a controller.

Also, in addition to the middleware profiles and services illustrated in FIG. 2(b), the middleware may include various profiles and/or services as follows:

Audio Session Capability Service (ASCS): Audio Session Capability Service (ASCS) is a service that supports to advertise or discover capabilities related to an audio session;

Audio Stream Session Service (Audio Stream Session Service, ASSS): Audio Stream Session Service (ASSS) is a service that supports discovery, setup, establishment, control, and management related to an audio session;

Audio Input Management Service (AIMS): a service for managing audio input volume, etc.;

Audio Routing Service (ARS): a service for selecting the location of audio inputs and outputs;

Audio Middleware Profile (AMP): a basic profile for the behavior of a device to distribute audio;

Call Management Profile (CMP): a profile of the roles and procedures of interaction between two devices for a call;

Audio General Middleware Profile (AGMP): a basic profile that enables content and/or stream control;

Group Identification Service (GIS): a service for the discovery of devices belonging to a group. A Group Identification Service (GIS) or Group Identification Profile (GIP) may allow devices to be discovered as part of a group. A group is defined as a group of devices that operate together to support a specific scenario, and these devices may be referred to as group members. For example, a group of devices that respond to a control command together, such as a pair of hearing aids, a pair of earbuds, or a set of speakers that receive multichannel (e.g., 5.1CH) audio, may be such examples:

Audio Player Management Profile (APMP): a profile that supports the control or interaction of an audio player;

Audio Player Management Service (APMS): a service that supports the control or interaction of an audio player;

Microphone Management Profile: a profile for microphone state management;

Microphone Management Service: a service that supports interfaces and states for microphone state management;

Quick Service Discovery Service (QSDS): a service that supports quick discovery of services such as audio player management and call management;

Call Bearer Service: a service that supports management of a call interface and a call state for a bearer on a device;

Volume Management Profile: a profile that supports audio volume management of a device;

Volume Management Service: a service that supports the device's audio volume interface and state;

Volume Offset Management Service: a service for volume management for audio output.

Figure 3:
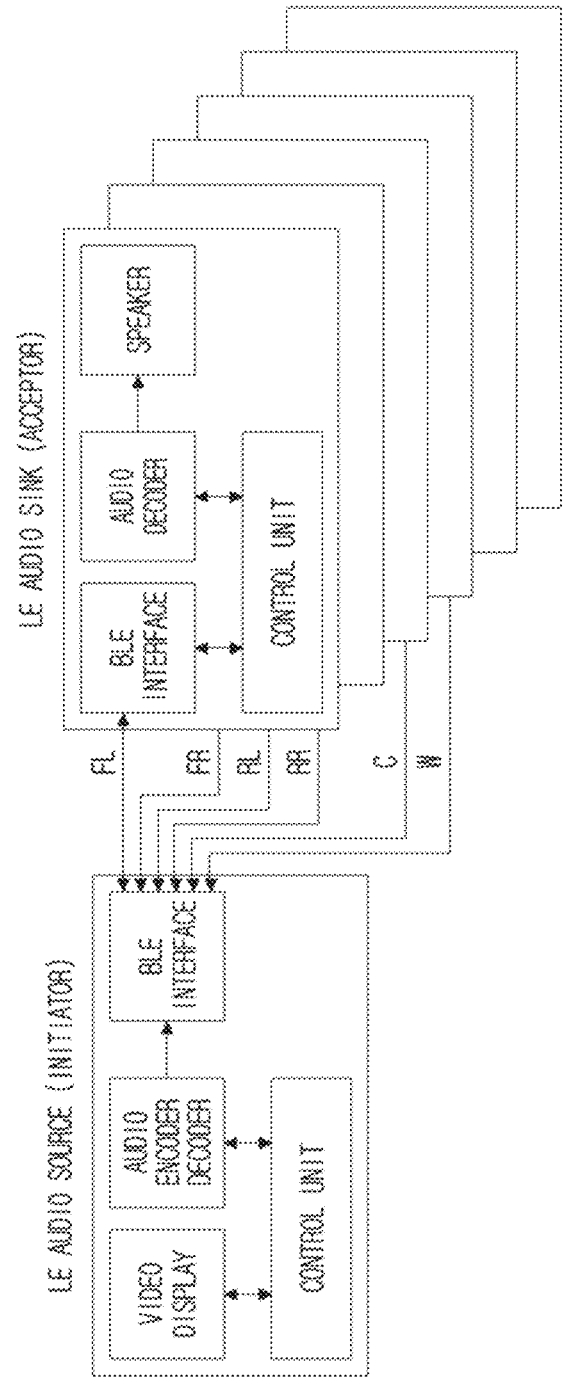
FIG. 3 is a diagram illustrating examples of 5.1 channel surround system hardware to which the present disclosure is applicable.

FIG. 3 illustrates examples of 5.1 channel surround system hardware to which the present disclosure is applicable.

In FIG. 3, a LE audio source device may perform a function of an initiator, and a LE audio sink device may perform a function of an acceptor. The initiator means a device that initiates an audio session, and the acceptor means a device that accepts the initiation of an audio session. Here, a source is not always the initiator or a sink is not always the acceptor, and the source may be the acceptor or the sink may be the initiator.

For example, an audio source may be a TV device, and an audio sink may be a speaker device. The audio source may transmit audio data to the audio sink. In addition, the audio source may receive feedback data from the audio sink. A plurality of audio sinks may receive audio data corresponding to one of 5.1 channels, respectively, FL (Front Left), FR (Front Right), RL (Rear Left), RR (Rear Right), C (Center), and W (Woofer) and output it through the speaker.

An audio encoder or decoder may support various audio formats. For example, the audio format may include Bluetooth Low Energy Audio Codec (BLEAC), Dolby 5.1CH, Digital Surround Sound (DTS), and the like, and the characteristics of each format are as follows. BLEAC is a mono codec, and the 96 kbps transmission rate of BLEAC may provide the same quality as 256 kbps of SBC (Sub-Band Codec) and 200 kbps of MP3. Dolby 5.1CH may support a 48 kHz sampling rate, support 1 to 5.1 (or 1 to 6) channels and support a transmission rate of up to 448 kbps. DTS may support 48 kHz or 96 kHz sampling rate, support 2 to 6.1 channels, and support transmission rates of 768 kbps half rate and 1,536 kbps full rate.

Figure 4:
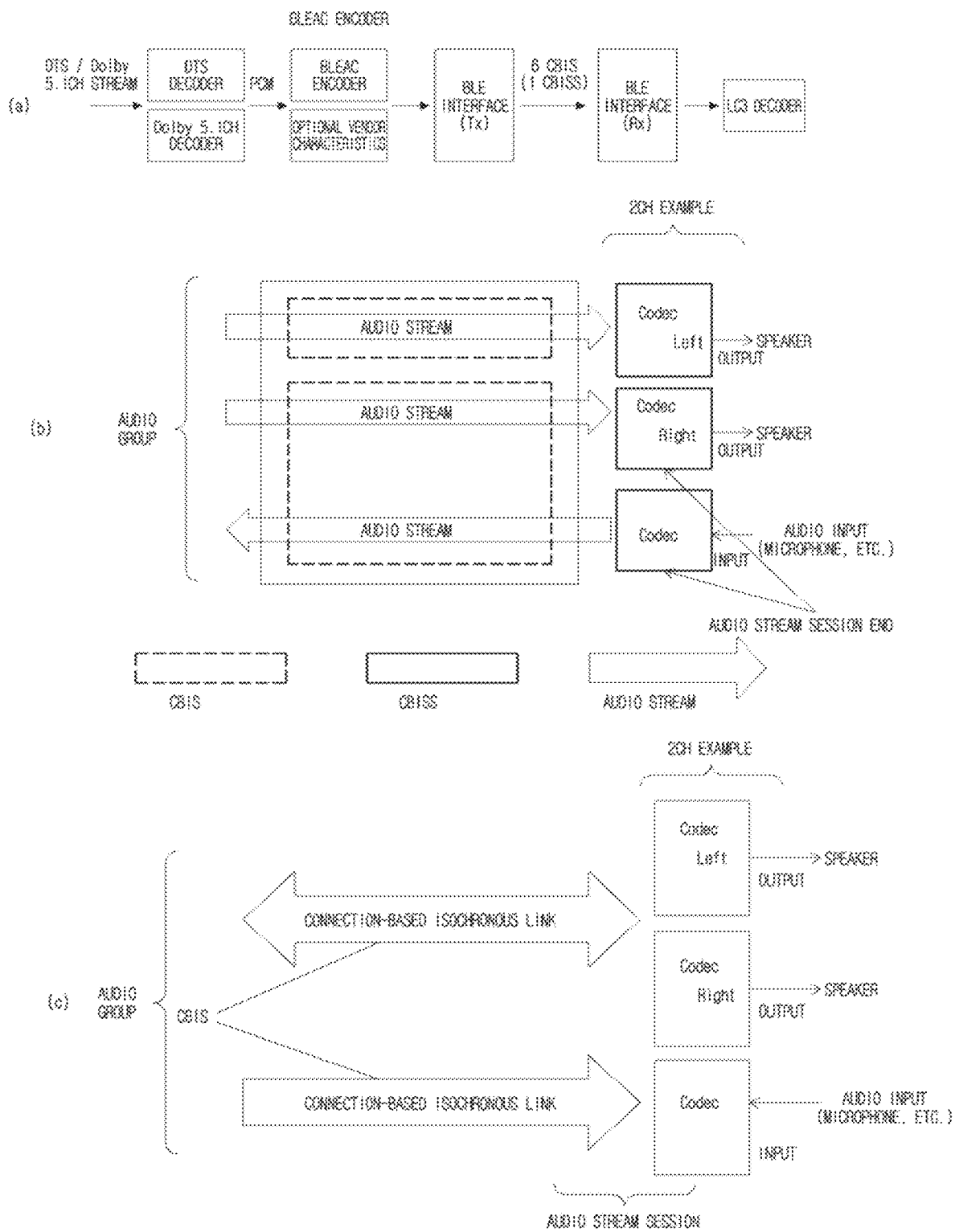
FIG. 4 is a diagram illustrating an audio data encoding/decoding process to which the present disclosure is applicable.

FIG. 4 is a diagram illustrating an audio data encoding/decoding process to which the present disclosure is applicable.

Referring to FIG. 4(a), a DTS format stream or a Dolby 5.1CH format stream may be input to a DTS decoder or a Dolby 5.1CH decoder of the transmitting end (Tx) and an audio signal in a PCM (Pulse-Code Modulation) format may be output. The PCM signal may be input to the BLEAC encoder and output as an audio signal in the BLEAC format. Here, optional vendor-specific information may be added. The BLEAC signal may be transmitted to the BLE interface of the receiving end (Rx) through the BLE interface. The receiving end may process the BLEAC signal through the BLEAC decoder and convert it into a signal that can be output through the speaker.

Here, a plurality of streams may be transmitted from a transmitting end to a plurality of receiving ends. For example, each of the plurality of streams may include an audio signal corresponding to one channel among 5.1 CHs. The plurality of streams may be received at different times from the plurality of receiving ends, but have isochronous properties that require play or rendering at the same time, and these streams may be called CBIS (Connection Based Isochronous Stream). That is, six CBISs corresponding to 5.1CH may be transmitted from a transmitting end to a receiving end, and a set of these six CBISs may be referred to as one CBISS (Connection Based Isochronous Steam Set).

FIGS. 4(b) and 4(c) conceptually illustrates audio streaming through a plurality of streams. One or more audio streams may correspond to CBIS, and an audio group may correspond to CBISS. For example, one audio stream may correspond to one CBIS, and two or more audio streams may correspond to one CBIS. A plurality of CBISs may be included in one audio group or CBISS.

Figure 5:
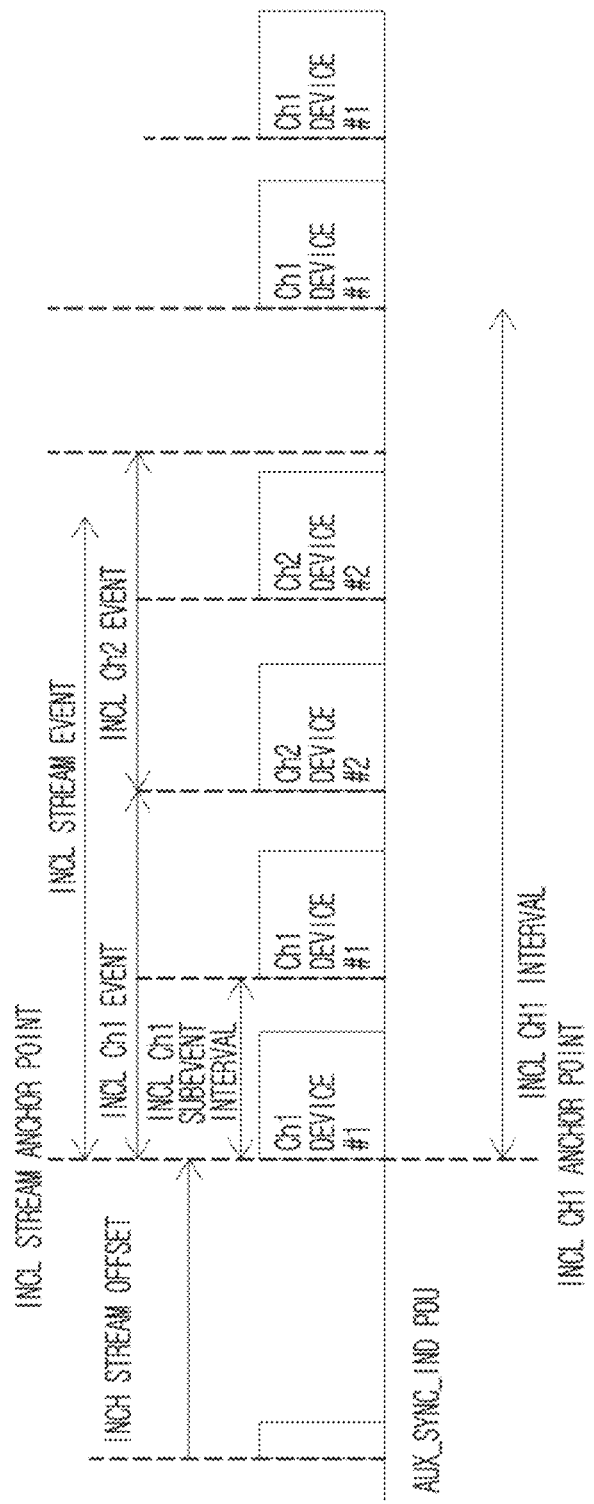
FIG. 5 is a diagram illustrating an example of channel allocation for two devices to which the present disclosure is applicable.

FIG. 5 is a diagram illustrating an example of channel allocation for two devices to which the present disclosure is applicable.

The receiving end may initiate stream reception according to timing information provided by the transmitting end. For example, the timing information may indicate a time point after a predetermined offset from a time point at which a data unit including the timing information is transmitted. The receiving end may receive audio data corresponding to one or more channels included in the stream. For example, a plurality of channels included in one stream may be allocated to a plurality of receiving ends, respectively. A plurality of channels (or a plurality of audio data) included in one stream may be transmitted in a time division multiplexing (TDM) method. For example, audio data of a first channel may be transmitted at a first timing, and audio data of a second channel may be transmitted at a second timing.

The broadcast receiving end may detect a currently obtainable broadcast audio stream, a stream offset value, a stream interval value, and the like, by using information included in a data unit periodically advertised by the transmitting end.

In the case of an Isochronous Non-Connection Link (INCL), which is a connectionless-based isochronous link, an isochronous channel may be transmitted/received (e.g., in a broadcast manner) without a connection between a source device and a sink device. From information such as BSG (Broadcast Synch Group) included in the AUX_SYNC_IND Protocol Data Unit (PDU) advertised by the transmitting end, the receiving end may check the INCL stream offset or BSG offset, and determine the anchor point timing. INCL stream transmission may start from the anchor point. A timing difference between two consecutive anchor points may be defined as an interval (e.g., an INCL CH1 interval or an ISO interval of FIG. 5). One or more sub-events may be included in the stream transmission event.

In the example of FIG. 5, one audio stream may include audio data for two channels. The first channel (CH1) may be allocated to the first device (device #1), and the second channel (CH2) may be allocated to the second device (device #2). At one or more timings after the anchor point, CH1 included in the INCL stream may be transmitted to the device #1, and thereafter, CH2 may be transmitted to the device #2 at one or more timings. In addition, the INCL stream event may include an event for CH1 and an event for CH2. An event for CH1 may include two sub-events. An event for CH2 may include two sub-events. A timing difference between-sub-events may be defined as a sub-event interval.

Isochronous audio data may have a limited lifetime. That is, the audio data may be invalidated after the predetermined time has expired. For example, a predetermined timeout value may be defined in the ICL channel, and isochronous audio data transmitted to a plurality of devices may be discarded after the predetermined timeout value has expired. For example, a timeout may be expressed as a number of sub-events.

Figure 6:
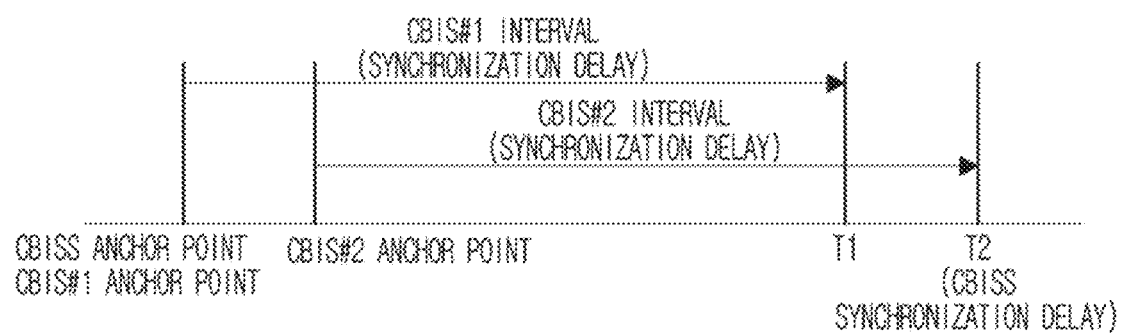
FIG. 6 is a diagram for describing a synchronization delay of two streams to which the present disclosure is applicable.

FIG. 6 is a diagram for describing a synchronization delay of two streams to which the present disclosure is applicable.

It is assumed that a plurality of streams are included in one audio group, and the plurality of streams have isochronism required to be reproduced at the same time. A plurality of streams may be transmitted from one device or may be transmitted from different devices. Also, the plurality of streams may be received by one device or may be received by different devices.

Since the Bluetooth communication method does not support simultaneous transmission of a plurality of streams, the plurality of streams may be transmitted in the TDM method on different time resources (or timings) according to a predetermined order. In this case, a difference may occur in the transmission timing of the plurality of streams, and accordingly, a difference may also occur in the reception timing of the plurality of streams. In addition, since a plurality of streams are required to be reproduced simultaneously, the stream received first cannot be reproduced first, but may be reproduced after waiting until the last stream is received. That is, a synchronization delay may occur until a timing at which reception of all streams is completed.

In the example of FIG. 6, the first stream (CBIS #1) and the second stream (CBIS #2) may be required to be reproduced simultaneously, and may be included in one CBISS. The CBISS anchor point may be same as the anchor point of CBIS #1, and after the CBIS #1 audio data may be transmitted, CBIS #1 audio data subsequent to the time point (e.g., T1) after the CBIS #1 interval may be transmitted. Next, after CBIS #2 audio data is transmitted from the anchor point of CBIS #2, CBIS #2 audio data subsequent to a time point after the CBIS #2 interval (e.g., T2) may be transmitted. After all streams included in one CBISS are received, they may be reproduced simultaneously. That is, the audio data of CBIS #1 and CBIS #2 may be processed and reproduced at the time of completion of reception of CBIS #2, which is transmitted relatively late.

Here, the synchronization delay of the CBISS may be defined as a time interval until the reception completion time (T2) of CBIS #2, which is received relatively late from the CBISS. For example, the later time point among the reception completion time T1 of CBIS #1 and the reception completion time T2 of CBIS #2 may be determined as the synchronization delay of the CBISS. That is, a later reception completion time among synchronization delays of a plurality of streams may be determined as a synchronization delay of the CBISS. Specifically, when CBIS #1 and CBIS #2 are bundled into the same single CBISS, the previously received stream CBIS #1 may be reproduced after waiting until the received stream CBIS #2 information is transmitted.

The transmitting end (Tx) may inform the receiving end (Rx) of an expected delay value calculated in consideration of the number of CBISs, CBIS events, sub-events, and intervals in advance. For example, the transmitting end may inform the receiving end of the expected delay value when configuring the channel.

In the case of a connection-based isochronous connection link (ICL), since the transmitting end and the receiving end are connected, the receiving end may inform the transmitting end of the actual delay value.

In the case of INCL, since the transmitting end and the receiving end are not connected, the receiving end cannot inform the transmitting end of the actual delay value. Even if the delay value may be informed from the receiving end to the transmitting end, the transmitting end cannot control the playback time of a specific device in order to synchronize the plurality of devices.

For example, even in the case of INCL, when a plurality of CBISs (e.g., six CBISs corresponding to six channels of 5.1CH) are included in one CBISS, the transmitting end may receive feedback from the receiver to adjust synchronization. Through the feedback, the receiving end may inform the transmitting end of its delay information.

Figure 7:
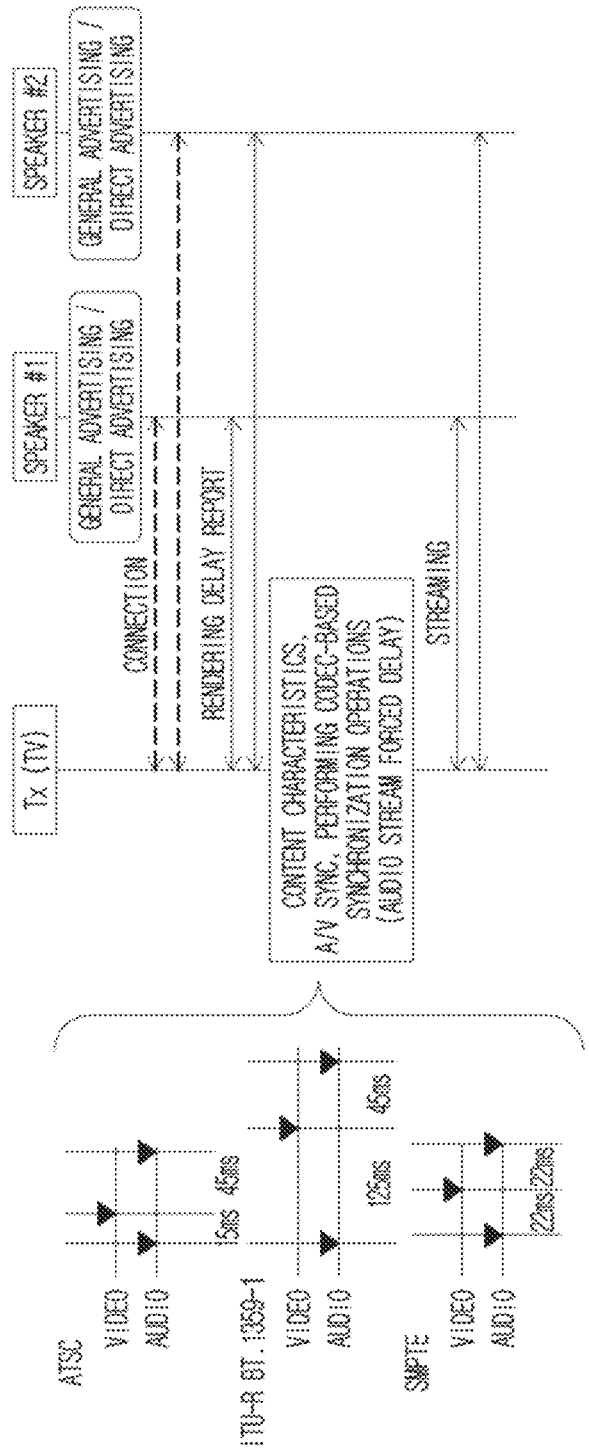
FIG. 7 is a diagram for describing a broadcast operation for a plurality of devices to which the present disclosure is applicable.

FIG. 7 is a diagram for describing a broadcast operation for a plurality of devices to which the present disclosure is applicable.

The audio source device may calculate a synchronization delay value for simultaneous reproduction of isochronous streams and transmit it to a plurality of audio sink devices. Each of the sink devices may determine the playback timing based on the delay value provided from the source device. That is, since the source device cannot accurately know the amount of time the sink device takes to receive and process audio data, the sink device may provide the delay value as basic information for determining the playback timing. The sink device may determine a reproduction timing according to its device characteristics and reproduce audio data.

For example, in an Isochronous Broadcast operation, a source device (e.g., a TV) may calculate a transmission delay, a rendering delay, etc., and transmit to a sink device (e.g., speaker). The sink device may adjust playback or rendering timing of audio data by reflecting the received delay value. Since device characteristics are different for each sink device manufacturer, the actual playback timing may be determined by the sink device.

If the sink device can transmit information to the source device, the sink, the sink device may calculate a delay value and transmit to the source device. Accordingly, the source device may determine the transmission timing based on the delay value provided from the sink device.

For example, a feedback channel may be formed through which a sink device (e.g., a speaker) may communicate information to a source device (e.g., a TV). In this case, a unicast operation based on an isochronous connection may be performed. The sink device may calculate a rendering delay value and transmit it to the source device through a feedback channel. Accordingly, the source device may adjust the transmission time of the audio data by reflecting the delay value provided from the sink device.

Referring to FIG. 7, an isochronous stream operation is exemplarily illustrated in the case where a transmitting end is a TV, and two receiving ends are a first speaker (speaker #1) and a second speaker (speaker #2). The first speaker may be allocated a first stream/channel (e.g., RR channel in 5.1CH), and the second speaker may be allocated a second stream/channel (e.g., RL channel in 5.1CH).

The first and second speakers may transmit an audio general advertisement or an audio directed advertisement, respectively. At least one of the TV and the first speaker or the second speaker may or may not be connected to each other.

When at least one of the TV and the speaker is connected, the speaker may calculate a rendering delay value and report it to the TV. When the TV and the speaker are not connected, the TV may calculate the transmission delay, rendering delay value, and the like, and send it to the speaker.

The TV may perform a synchronization operation in consideration of, audio content characteristics, audio/video synch, codec characteristics, and the like, and forcibly apply a delay to a specific audio stream. For example, since the audio codec encoding/decoding delay is different from 40 ms for BLEAC, 200 ms for SBC, 100 ms for APT-X, etc., the delay value may be determined according to codec characteristics. In addition, since characteristics of A/V content are different according to games, movies, animations, and the like, a delay value may be determined in consideration of this. Also, a delay value may be determined in consideration of a difference between a media clock and a clock of the BLE interface. The media clock may be confirmed through A/V time scale information.

In addition, as shown on the left side of FIG. 7, a delay value may be determined in consideration of audio/video signal processing time defined in various broadcasting standards. For example, the time interval between audio-video-audio is 15 ms and 45 ms in Advanced Television Systems Committee (ATSC), 125 ms and 45 ms in ITU-R BT.1359-1, and SMPTE (Society of Motion Picture and Television Engineers) It is defined as 22 ms and 22 ms, and a delay value may be determined in consideration of these time intervals.

The TV may configure the rendering delay value of each stream and inform the speaker, or determine the transmission timing of the stream based on the delay value provided from the speaker.

The TV may transmit a stream to the speaker based on the determined delay value. That is, the source device or the TV which is the transmitting end may exchange a delay value with the sink device and the speaker(s) which is the receiving end, and may perform an operation of synchronizing by reflecting the delay value.

Figure 8:
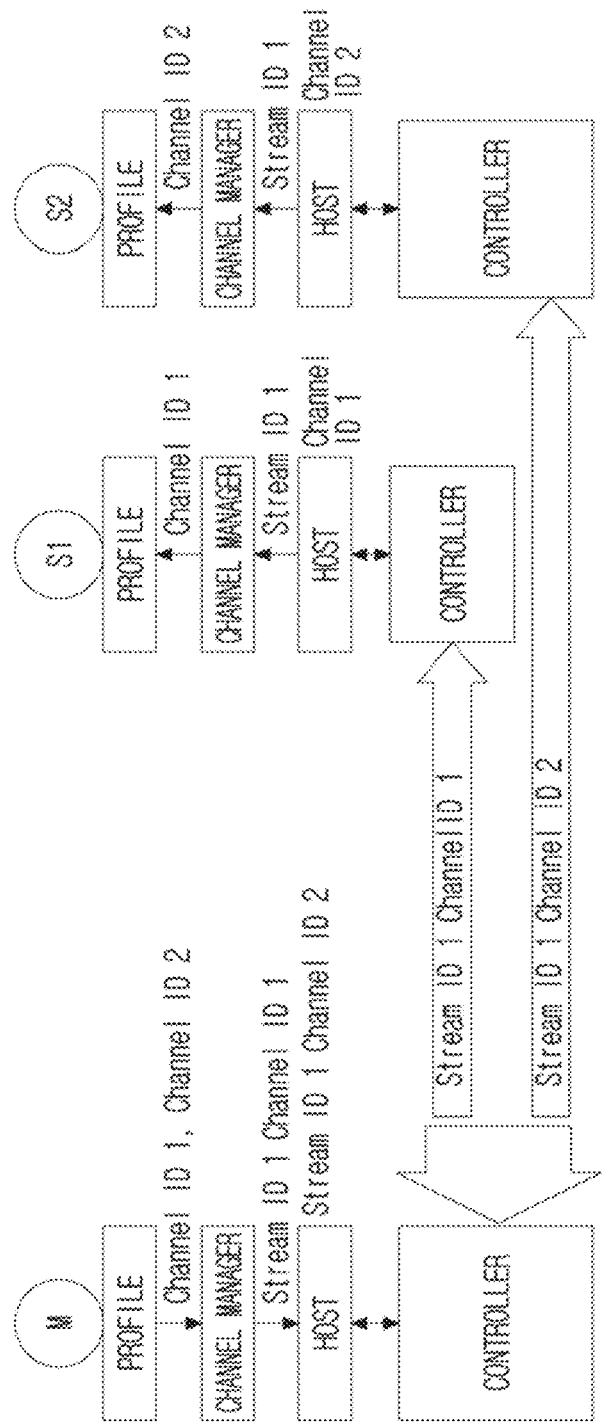
FIG. 8 and FIG. 9 are diagrams for describing the operation of the ICL type and the INCL type to which the present disclosure is applicable.
Figure 9:
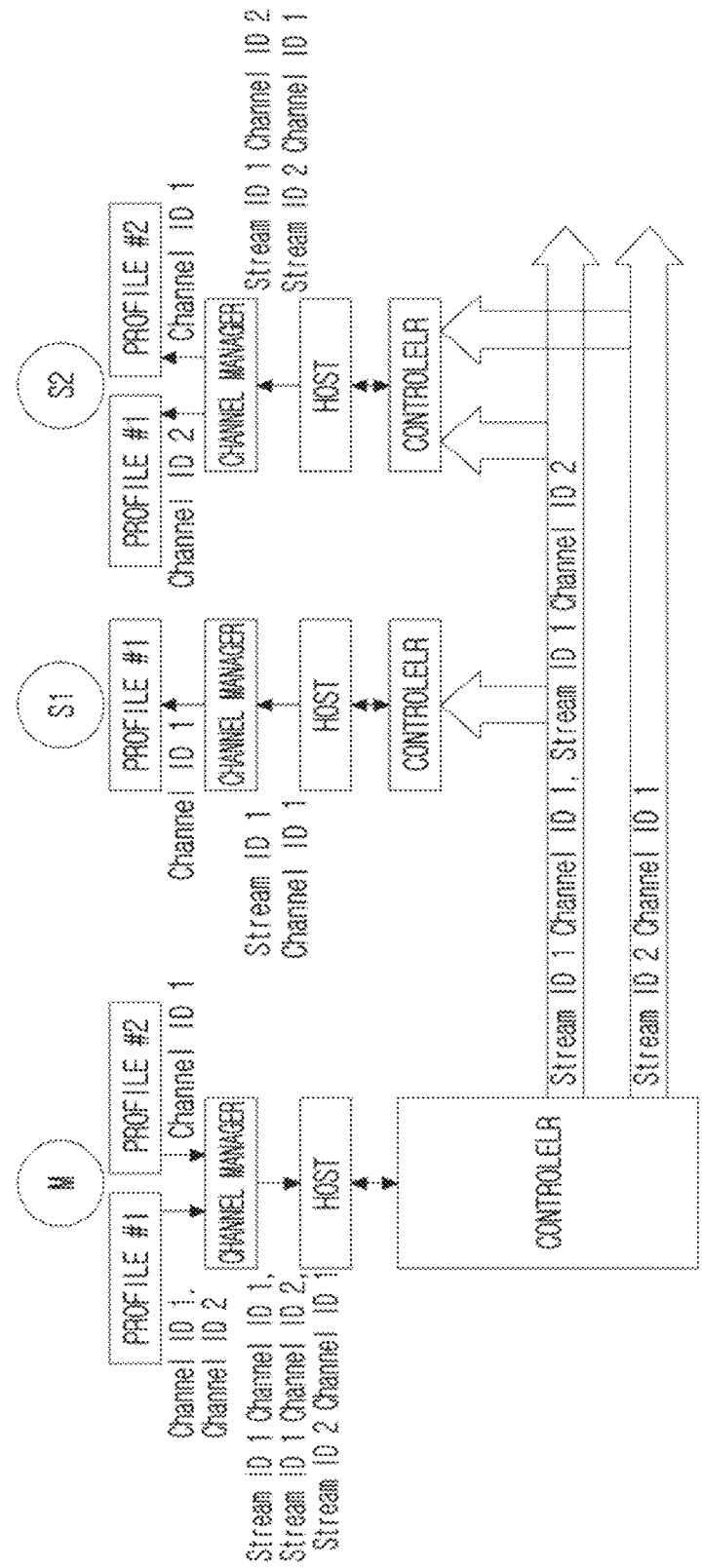

FIG. 8 and FIG. 9 are diagrams for describing the operation of a ICL type and a INCL type to which the present disclosure is applicable.

In BLE, a channel for audio transmission may be classified into an ICL type and an INCL type. Both the ICL channel and the INCL channel may transmit audio data to multiple devices and/or multiple profiles using a stream ID and a channel ID. According to the ICL type and the INCL type, it may be determined what operation is to be performed on the BLE channel for audio data transmission.

ICL channels correspond to a connection-based use case that supports unidirectional or bidirectional communication through a point-to-point physical link between one source device and one sink device. In addition, INCL channels correspond to a broadcast use case that supports only unidirectional communication through a point-to-multipoint physical link between one source device and one or more sink devices.

The protocol stack of the device may include a profile layer, a channel manager layer, a host layer, and a controller layer in order from an upper layer to a lower layer. Data may be transferred between the profile layer and the channel manager layer in units of channels, and data may be transferred between the channel manager layer and the host layer in units of streams.

Referring to FIG. 8, in case of the ICL type, a connection between a master (M) and the first slave S1 and a connection between the master M and the second slave S2. In this case, it is possible to divide two channels included in one stream by a channel identifier and transmit to the two slaves. That is, channel ID 1 may be allocated to the S1 and channel ID 2 may be allocated to the S2. Both the channel ID 1 and the Channel ID 2 may be transmitted through the same stream ID 1. In addition, since bidirectional communication is possible based on the connection, the slaves may provide feedback information to the master M. For example, when S1 is a wireless earphone mounted on the right ear and S2 is a wireless earphone mounted on the left ear, it is possible to listen to music transmitted by the master M in stereo through S1 and S2.

Referring to FIG. 9, in the case of the INCL type, there is no connection between the master M and the slaves (S1, S2), and the slaves may synchronize with a INCL stream offset, an event, a timing of the sub-event based on the synchronization information advertised by the master and may receive broadcast audio data. In addition, the master M may include two profiles (profile #1 and profile #2). The first slave S1 may include the profile #1, and the second slave S2 may include the profile #1 and the profile #2. In Profile #1, the channel ID 1 and the channel ID 2 may be broadcast from the master M through one stream, Stream ID 1, and it is similar to FIG. 8 that the slaves S1 and S2 respectively receive the channel ID 1 and the channel ID in Profile #1. Additionally, in profile #2, the channel ID 1 may be broadcast from the master M through Stream ID 2, and the second slave S2 may receive Channel ID 1 in profile #2.

Figure 10:
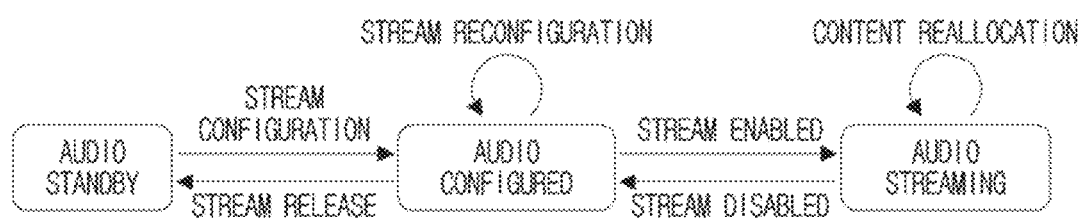
FIG. 10 is a diagram illustrating a broadcast audio stream state machine to which the present disclosure is applicable.

FIG. 10 is a diagram illustrating a broadcast audio stream state machine to which the present disclosure is applicable.

The control of the broadcast audio stream may be described as a broadcast audio stream state machine and state transition at the broadcast transmitting end.

The broadcast audio stream state machine may allow a broadcast transmitter to communicate with one or more broadcast receivers (or broadcast discovery clients) in a one-way manner without a connection or not with a broadcast receiver (or broadcast discovery client). The broadcast transmitter may communicate using a broadcast audio advertisement in the form of a Broadcast Audio Source Session (BASS). A broadcast audio stream may be transmitted by a broadcast transmitter.

The AUDIO STANDBY state means a state in which a broadcast audio stream is not transmitted.

The AUDIO CONFIGURED state means a state in which a broadcast receiver (or a broadcast discovery initiator) starts advertising information for detecting an audio stream through a periodic advertising event. The periodic advertising event may include delivering advertisement metadata, stream configuration, synchronization information, and the like. In this state, no audio data packet is transmitted from the broadcast transmitter.

The AUDIO STREAMING state means a state in which a broadcast audio stream is enabled in a broadcast transmitter and an audio data packet may be transmitted. The broadcast transmitter may continuously perform metadata advertising through periodic advertising while transmitting the broadcast audio stream. If a stream is configured in the AUDIO STANDBY state, it may transition to the AUDIO CONFIGURED state, and if the stream is released in the AUDIO CONFIGURED state, it may transition to the AUDIO STANDBY state. If a stream is enabled in the AUDIO CONFIGURED state, it may transition to the AUDIO STREAMING state, and if the stream is disabled in the AUDIO STREAMING state, it may transition to the AUDIO CONFIGURED state. If a stream reconfiguration occurs in the AUDIO CONFIGURED state, it may transition to the AUDIO CONFIGURED state. When content reassignment occurs in the AUDIO STREAMING state, it may transition to the AUDIO STREAMING state.

Figure 11:
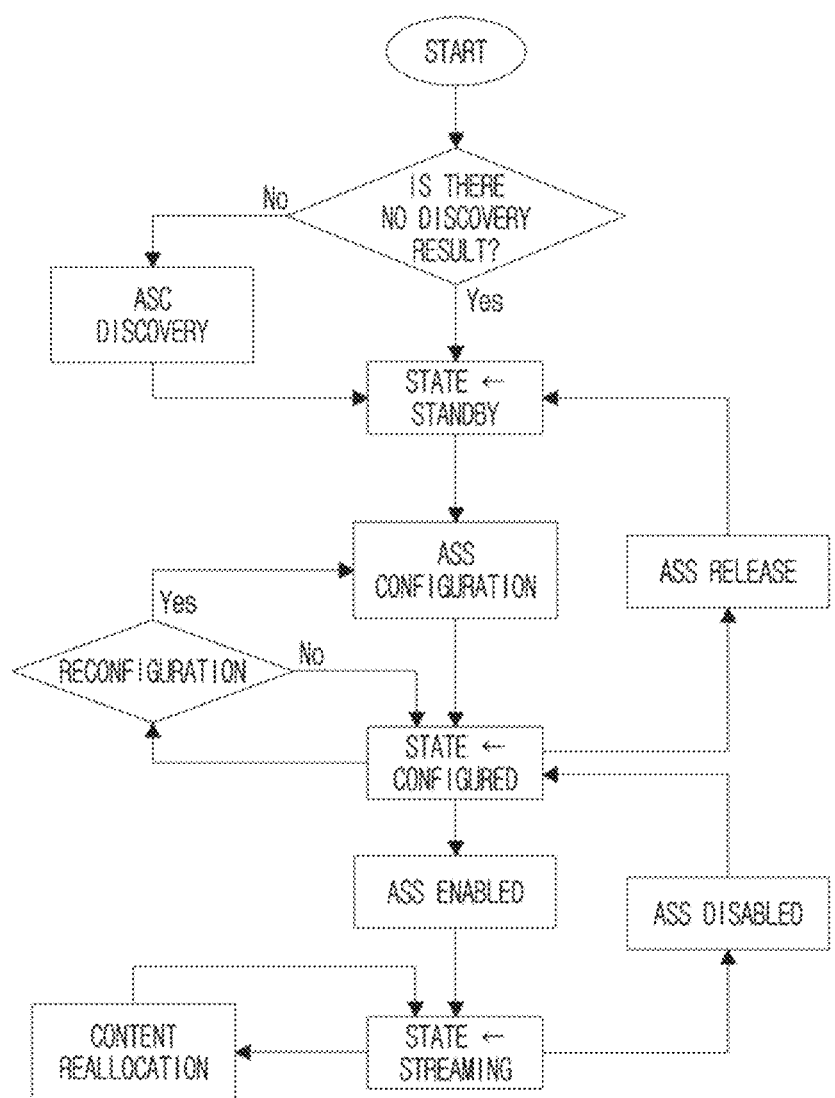
FIG. 11 is a diagram illustrating an audio setup procedure to which the present disclosure is applicable.

FIG. 11 is a diagram illustrating an audio setup procedure to which the present disclosure is applicable.

When there is no discovery result (that is, zero discovery), the AUDIO STANDBY state may be transitioned, and if there is a discovery result, discovery for Audio Stream Capability (ASC) may be performed and transition to the AUDIO STANDBY state.

When an ASS (Audio Stream Session) configuration occurs, it may transition to the AUDIO CONFIGURED state. If ASS is released in the AUDIO CONFIGURED state, it may transition to the AUDIO STANDBY state. When reconfiguration occurs in the AUDIO CONFIGURED state, it may transition to the AUDIO CONFIGURED state through the ASS configuration.

When ASS is activated, it may transition to AUDIO STREAMING state. If ASS deactivation occurs in the AUDIO STREAMING state, it may transition to the AUDIO CONFIGURED state. If content reassignment occurs in the AUDIO STREAMING state, it may transition to the AUDIO STREAMING state.

Figure 12:
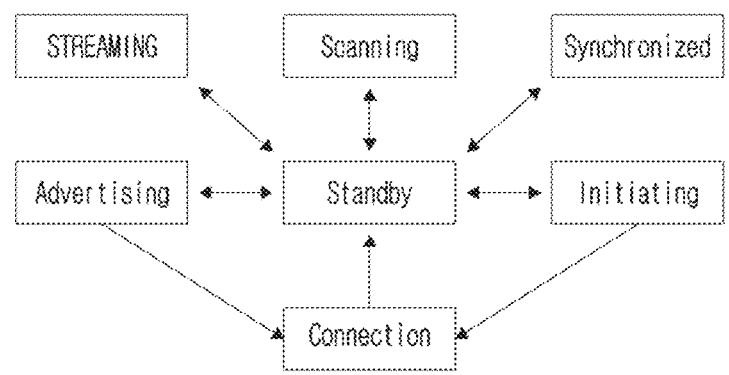
FIG. 12 is a diagram illustrating a link layer state machine to which the present disclosure is applicable.

FIG. 12 is a diagram illustrating a link layer state machine to which the present disclosure is applicable.

The operation of the link layer LL may be expressed as (in terms of an isochronous channel) Standby state, Advertising state, Scanning state, Initiating state, Connection state, Synchronized (synchronization) state, and Streaming (Isochronous Broadcasting) state.

The Standby state corresponds to a standby state before transitioning to another state.

In the Advertising state, the LL may operate as a advertiser transmitting an advertising packet. When a connection is established in the advertising state, the device may operate as a slave.

In the Initiating state, the LL may act as an initiator that listens for packets from other advertisers and initiates a connection in response to the packets. When a connection is established in the initiating state, the device may operate as a master.

In the Scanning state, the LL may act as a scanner that listens for packets from other advertisers and requests additional information.

The synchronized state may refer to a state in which an audio stream may be received or received in synchronization with another device.

The streaming state may refer to a state in which an audio stream is transmitted to another synchronized device.

Figure 13:
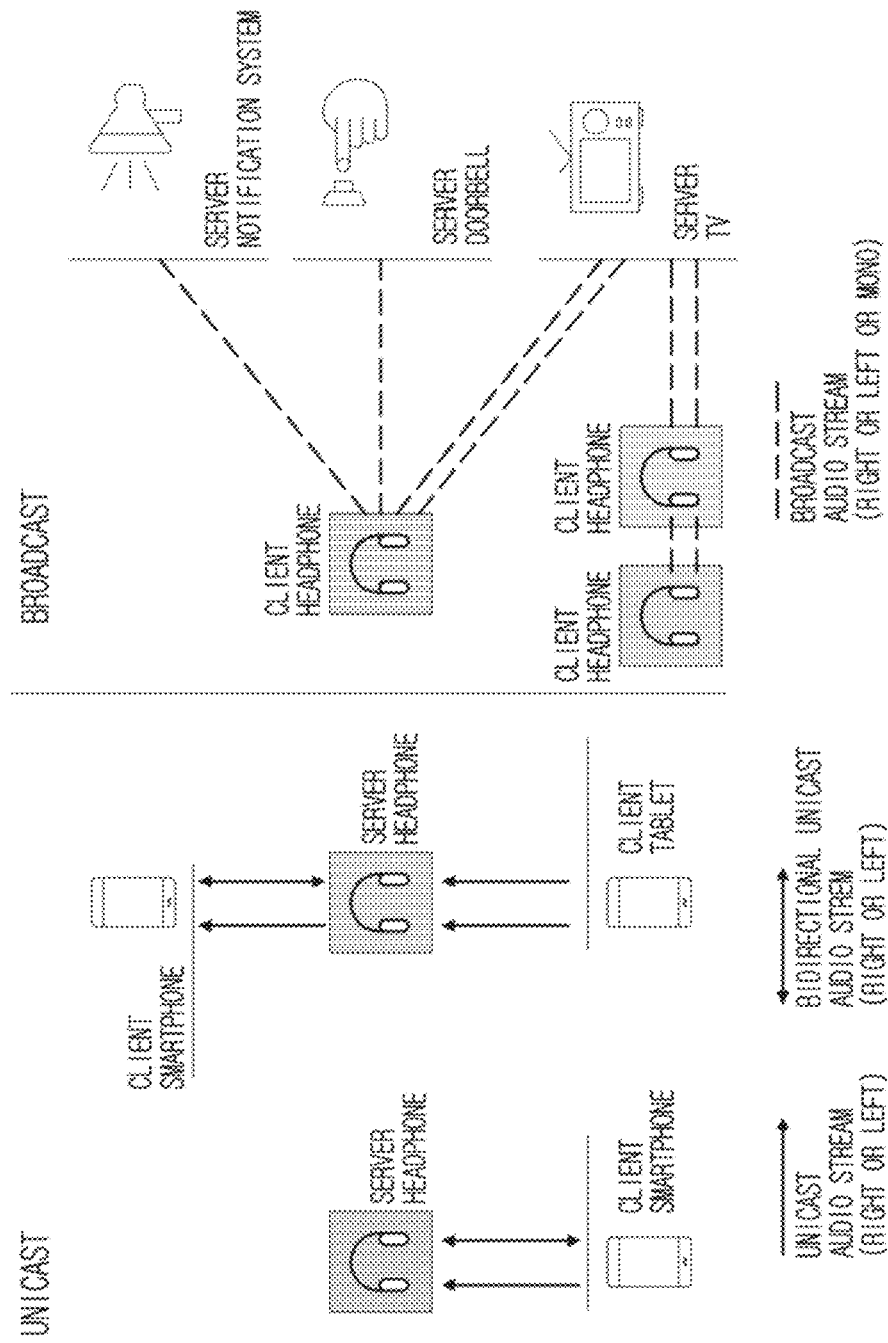
FIG. 13 is a diagram illustrating an example of an audio topology to which the present disclosure is applicable.

FIG. 13 is a diagram illustrating an audio topology to which the present disclosure is applicable.

In the case of unicast, unidirectional or bidirectional audio streams may be supported. Unicast audio data transmission/reception based on a connection between a headset and a smartphone may be performed, and the unicast audio data transmission/reception based on a connection between a headset and a smartphone and a connection between the headset and a tablet may be performed. In this case, the server of the unicast audio service may be a headphone, and the client may be a smartphone or tablet. Also, headphones may correspond to an audio sink, and a smartphone or tablet may correspond to an audio source.

In the case of broadcast, a notification system, a doorbell, a TV, etc. may transmit audio data in a broadcast manner, and one or more devices may receive the broadcast audio data. In this case, the server of the broadcast audio service may be a notification system, a doorbell, a TV, or the like, and the client may be a headphone. Also, the headphones may correspond to an audio sink, and a notification system, a doorbell, and a TV may correspond to an audio source.

Figure 14:
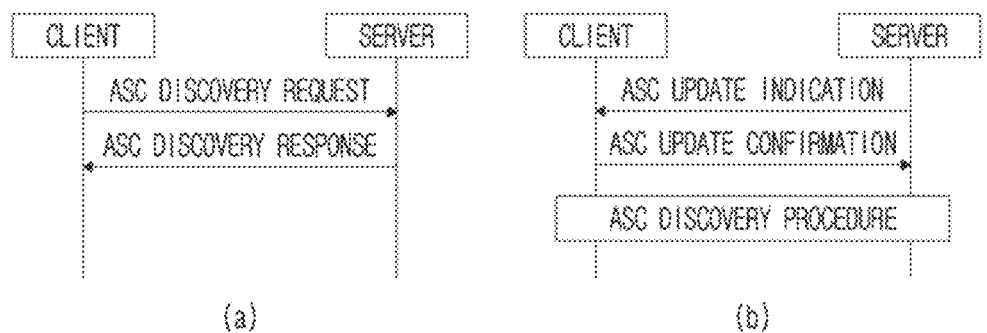
FIG. 14 to FIG. 16 are diagrams illustrating a message exchange process between a server and a client to which the present disclosure is applicable.
Figure 15:
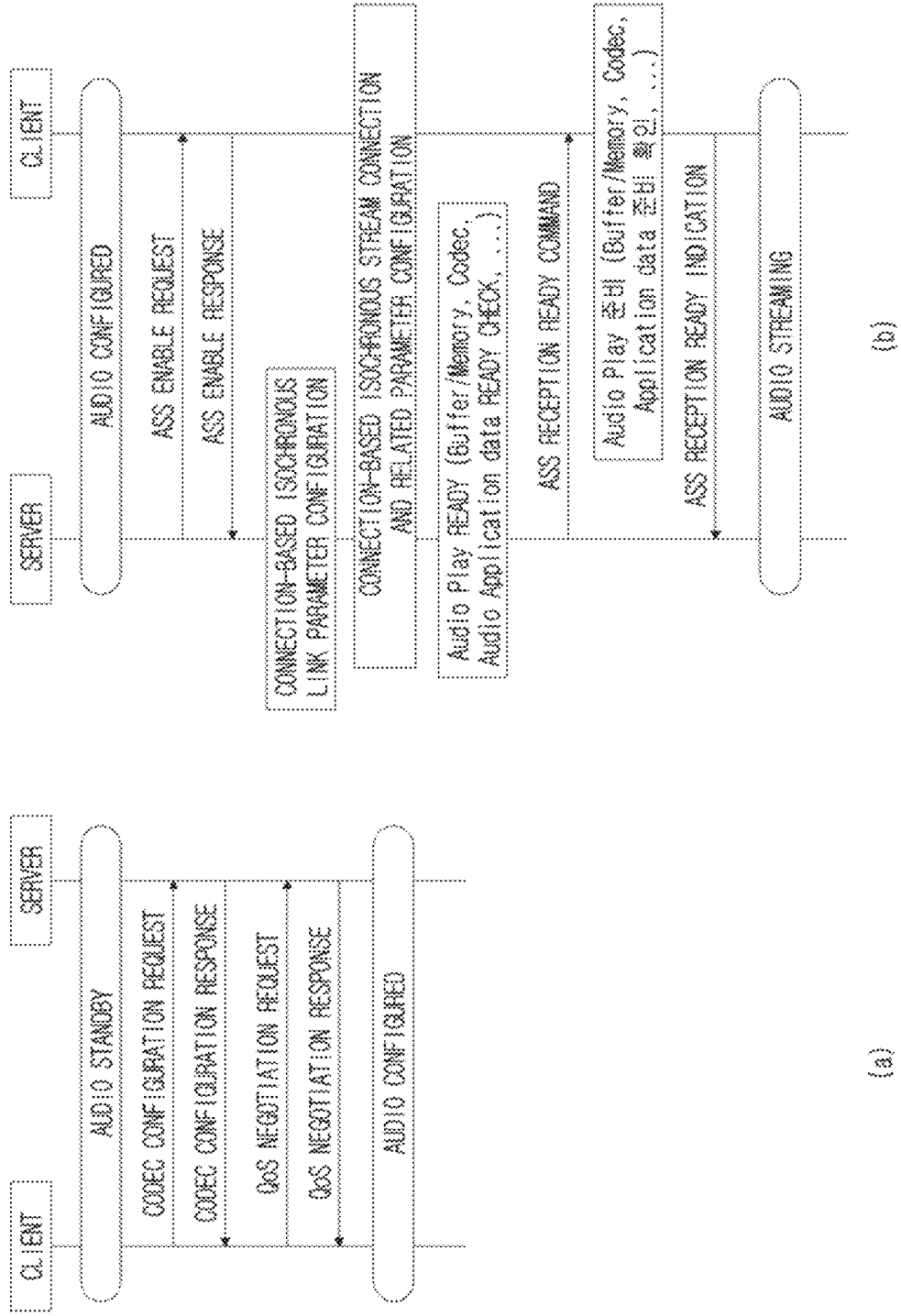
Figure 16:
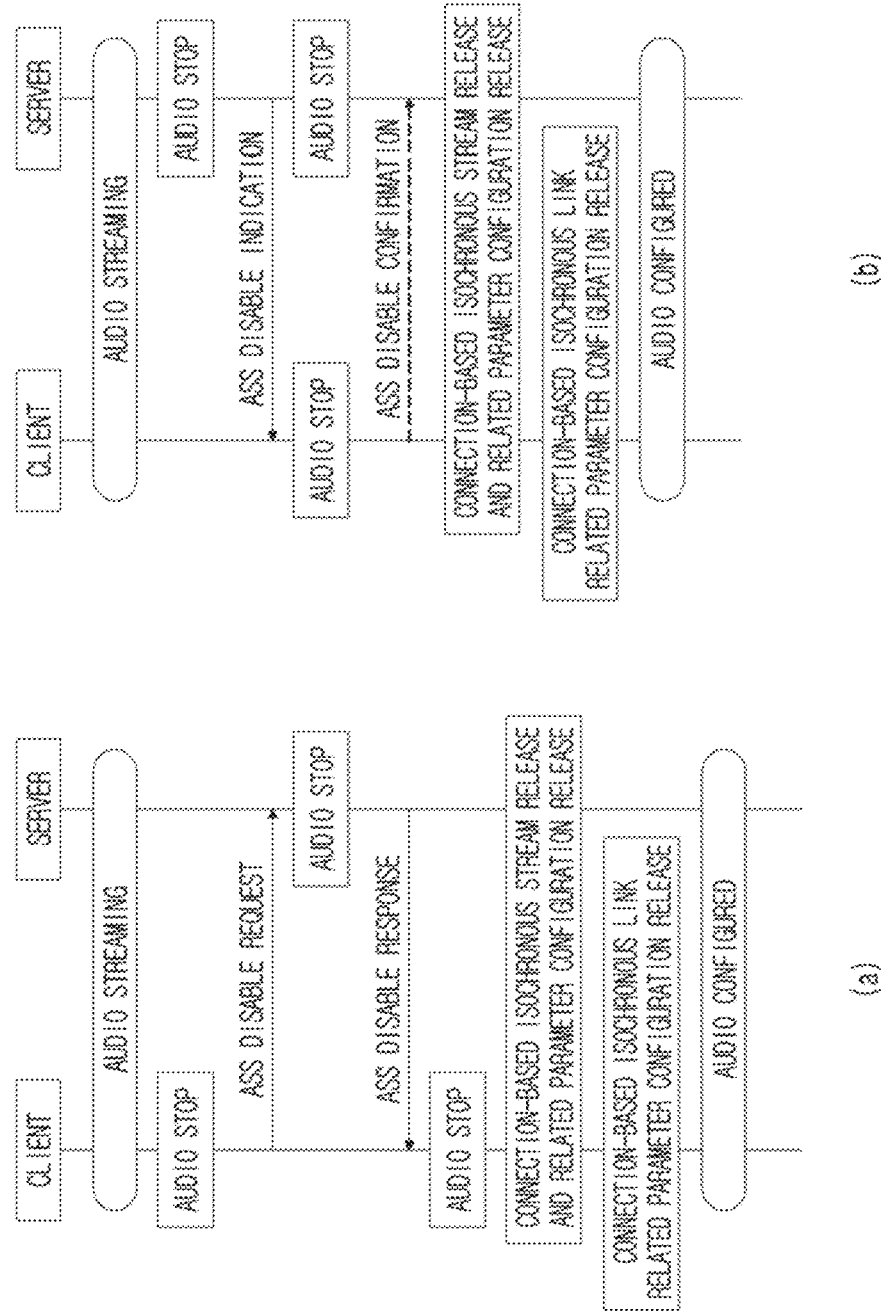

FIG. 14 to FIG. 16 are diagrams illustrating a message exchange procedure between a server and a client to which the present disclosure is applicable.

In the example of FIG. 14 to FIG. 16, the client may be an audio source and the server may be an audio sink. Or, the client may be an audio sink and the server may be an audio source.

FIG. 14 exemplarily illustrates an audio session capability (ASC) discovery procedure and an ASC update procedure.

In the audio session capability discovery procedure of FIG. 14(a), the client may request capability discovery by transmitting an ASC discovery request message to the server, and in response to that, the server may transmit detailed information of the capability by transmitting an ASC discovery response message to the client.

In the audio session capability update procedure of FIG. 14(b), the server may transmit an ASC update indication message to the client to inform that the capability update has occurred, and the client may notify the server to perform a capability update by transmitting an ASC update confirmation message. Subsequently, an audio session capability discovery procedure or an ASC discovery procedure may be performed.

The format of the message used in the example of FIG. 14 may be defined as shown in Table 1 below.

TABLE 1

ASC_DISCOVERY REQUEST
Direction
ASC_DISCOVERY RESPONSE
Sink Locations : Bitmap
Source Locations : Bitmap
Number of ASC Records
Direction
Codec ID
Sampling Frequency
Codec Specific
Content Protection Type
Content Protection type Specific The ASC update indication message and the ASC update confirmation message may include information indicating that ASC discovery is required and confirmation information therefor, respectively.

FIG. 15 exemplarily illustrate a unicast audio stream configuration procedure and an unicast audio stream establishment procedure.

In the unicast audio stream configuration procedure of FIG. 15 (a), the client, in the AUDIO STANDBY state, may transmit a Codec configuration request message to the server to inform the server of the codec requesting configuration, and the like. In response, the server may transmit a codec configuration response message to the client to inform the server of QoS and rendering delay values supported by the server. In addition, the client may transmit a QoS negotiation request message to the server to specify a specific audio stream session (ASS), an audio group, and an audio stream to inform the client of QoS and rendering delay values supported by the client. In response, the server may transmit a QoS negotiation response message to the client. Accordingly, bandwidth (BW), bitrate, etc. may be determined by negotiation between the client and the server, and the client and the server may transition to a CONFIGURED state.

In the unicast audio stream establishment procedure of FIG. 15 (b), the client may transmit an ASS enable request message to the server in the AUDIO CONFIGURED state to inform information on the ASS requesting activation. In response, the server may transmit an ASS enable response message to the client to inform about which ASS to activate. Configuration for connection-based isochronous link parameters may be performed at the client, and CBIS may be established by the client and the server configuring the connection-based isochronous stream connection and related parameters. If the client is the audio sink and the server is the audio source, the server may prepare to play audio data and transmit an ASS Rx ready indication message to the client, and the client may prepare to provide audio data after receiving the ASS reception ready indication notification message. Accordingly, the client and the server may transition to the AUDIO STREAMING state.

The format of the message used in the example of FIG. 15 may be defined as shown in table 2 below.

TABLE 2

CODEC CONFIGURATION REQUEST
ASS ID
ASA ID
Direction
Codec ID
Sampling Frequency

TABLE 2-continued

CODEC CONFIGURATION RESPONSE
ASS ID
Server Supported QoS (Interleaved, Framed, Transport Latency)
Presentation Delay
QOS NEGOTIATION REQUEST
ASS ID
CBISS ID
CBIS ID
Client QoS (Transport Latency)
Rendering Delay
QOS NEGOTIATION RESPONSE
ASS ID
ASS ENABLE REQUEST/ASS ENABLE RESPONSE
Number of ASS ID
ASS ID
ASA ID
Content Type
ASS RX READY COMMAND/ASS RX READY NOTIFICATION
Number of ASS ID
ASS ID FIG. 16 exemplarily illustrates a procedure for disabling an audio stream by a client and a procedure for disabling an audio stream by a server.

In the procedure of the client disable audio streams in FIG. 16(a), if the client is an audio source and the server is an audio sink, when the client decides to stop the audio in the AUDIO STREAMING state, an ASS disable request message may be transmitted to the server. Accordingly, the server may stop streaming audio data and transmit an ASS disable response message to the client. Upon receiving this, the client may stop audio data encoding and audio application operation.

Alternatively, if the client is an audio sink and the server is an audio source, the client may stop audio data streaming and transmit ASS disable request message to the client. Accordingly, the server may stop audio data encoding and audio application operation and transmit an ASS disable response message to the client.

After that, the client and the server may perform connection-based isochronous stream release and related parameter setting release. Here, in preparation for reconnection between the client and the server, device information may be stored in the client and/or the server together with an isochronous stream connection related parameter. Accordingly, the client may release the connection-based isochronous link related parameter setting. Accordingly, the client and the server may transition to the AUDIO CONFIGURED state.

In the example of FIG. 16(b), in the procedure of disabling audio streams by the server, if the server is an audio source and the client is an audio sink, when the server decides to stop audio in the AUDIO STREAMING state, an ASS disable indication message may be transmitted to the client. Accordingly, the client may stop streaming audio data and may or may not transmit an ASS disable confirmation message to the server. The server may stop encoding audio data and audio application operation with or without receiving an ASS deactivation response.

Alternatively, if the server is an audio sink and the client is an audio source, the server may stop audio data streaming and transmit an ASS disable indication message to the client. Accordingly, the client may stop the audio data encoding and audio application operation, and may or may not transmit an ASS disable confirmation message to the server.

After that, the client and the server may perform connection-based isochronous stream release and related parameter configuration release. Here, in preparation for reconnection between the client and the server, device information may be stored in the client and/or the server together with an isochronous stream connection related parameter. Accordingly, the client may release the connection-based isochronous link related parameter configuration. Accordingly, the client and the server may transition to the AUDIO CONFIGURED state.

The format of the message used in the example of FIG. 16 may be defined as shown in table 3 below.

TABLE 3

ASS DISABLE REQUEST/ASS DISABLE RESPONSE/ASS DISABLE INDICATION
Number of ASS ID
ASS ID
(No Contents)

Table 4 below exemplarily shows content reallocation request/response, ASS release request/response, general advertisement, and directed advertisement message formats.

TABLE 4

Figure 17:
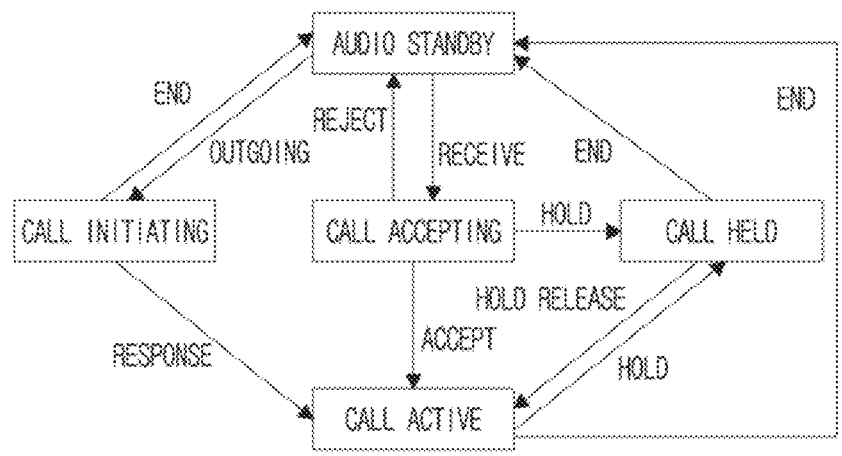
FIG. 17 is a diagram illustrating a state machine for a call service to which the present disclosure is applicable.

REASSIGN CONTENT REQUEST/REASSIGN CONTENT RESPONSE
Number of ASS ID
ASS ID
ASA ID
Content Type
ASS RELEASE REQUEST/ASS RELEASE RESPONSE
ASS ID
GENERAL ADVERTISEMENT
DIRECTED ADVERTISEMENT
Content Type
Meta data FIG. 17 is a diagram illustrating a state machine for a call service to which the present disclosure is applicable.

When a call is received in the AUDIO STANDBY state, it may transition to the CALL ACCEPTING state. When a call is accepted in the CALL ACCEPTING state, it may transition to the CALL ACTIVE state. When a call is rejected in the CALL ACCEPTING state, it may transition to the AUDIO STANDBY state. In the case of hold in which a call cannot be received in the CALL ACCEPTING state, it may transition to the CALL HELD state, and may transition to the CALL ACTIVE state when the hold is released in the CALL HELD state. When the CALL HELD state or the CALL ACTIVE state is terminated, it may transition to the AUDIO STANDBY state.

Also, When a call is outgoing in the AUDIO STANDBY state, it may transition to the CALL INITIATING state. When it answers a call from a remote location or the other party in the CALL INITIATING state, it may transition to the CALL ACTIVE state. When it ends in the CALL INITIATING state, it may transition to the AUDIO STANDBY state.

In such a call service state machine, audio data that needs to be delivered to the headset in the AUDIO STANDBY state may occur. For example, audio data may be transmitted to the headset when a response when a phone number is dialed is notified by sound.

Alternatively, information definitively indicating various wireless access technology (e.g., 2G, 3G, 4G, 5G, Wi-Fi, GSM, CDMA, WCDMA, etc.) related to the call service. For example, a bearer technology field having a size of 1 octet may be defined. This may be related to the aforementioned call bearer service.

In the case of multiway calling, a plurality of lines may exist, and a state machine as shown in FIG. 17 may be maintained for each line. For example, when the second line transitions from the AUDIO STANDBY state to the CALL ACCEPTING state while the first line is in the CALL ACTIVE state, the first or the second line may transition to the CALL HELD state according to the user's control.

Hereinafter, logical links of Bluetooth system and logical transports will be described.

A variety of logical links may be used to support different application data transfer requirements. Each logical link is associated with a logical transport, which may have various characteristics. These characteristics may include flow control, acknowledgment/repeat mechanisms, sequence numbering and scheduling operations, and the like. A logical transport may carry various types of logical links depending on its type. A plurality of logical links may be multiplexed into the same single logical transport. A logical transport may be carried by a physical link on a particular channel.

Logical transport identification and real-time (link control) signaling may be included in the packet header, and specific logical link identification may be included in the header of the payload.

Table 5 below exemplarily illustrates logical transport types, supported logical link types, supported physical link and physical channel types, and descriptions of logical transports.

address may have a size of 4 octets and may be used as a correlation code for a physical channel. A PDU may be defined with a size of 2 to 39 octets in Bluetooth 4.0 version, and may be defined as a size of 2 to 257 octets in version 4.2. The CRC may include a value calculated as a 24-bit long checksum for the PDU.

Figure 18:
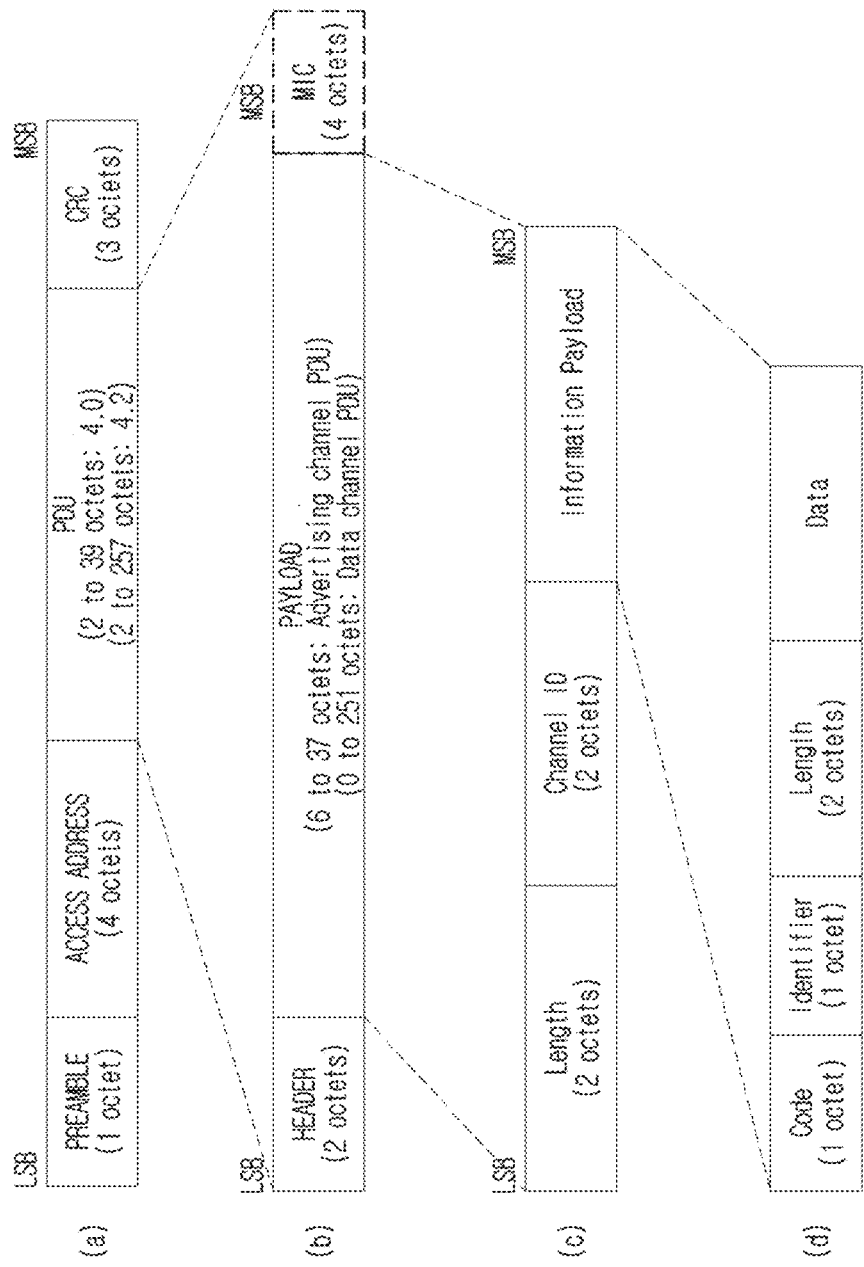
FIG. 18 is a diagram illustrating a packet format for each layer to which the present disclosure is applicable.

FIG. 18(*b*) illustrates an exemplary format of the PDU of FIG. 18(*a*). PDU may be defined in two types, one is a data channel PDU (Data channel PDU), the other is an advertising channel PDU (Advertising channel PDU). The data channel PDU will be described in detail with reference to FIG. 19, and the advertising channel PDU will be described in detail with reference to FIG. 20.

FIG. 18(*c*) illustrates an example of an L2CAP PDU format, which may correspond to an exemplary format of the payload field of FIG. 18(*b*). The L2CAP PDU may include a Length, a Channel ID, and an Information Payload field. The length field may indicate the size of the information payload, and the information payload field may include higher layer data. The channel identifier field may indicate which upper layer data the information payload field includes. For example, if the value of the channel identifier field is 0x0004, it may indicate ATT (ATTribute protocol), if the value of the channel identifier field is 0x0004, it may indicate SMP (Security Manager Protocol), or another channel identifier indicating a different type of upper layer or middleware Values may be defined and used.

When the L2CAP packet of FIG. 18(*c*) is an L2CAP PDU (i.e., a control frame) transmitted on a signaling channel, the information payload field of FIG. 18(*c*) may be configured as shown in FIG. 18(*d*). The information payload field may include a code (Code), an identifier (Identifier), a length (Length) and data (Data) fields. For example, the code field may indicate the type of the L2CAP signaling message. The identifier field may include a value that matches the request and the response. The length field may indicate the size of

TABLE 5

| Logical transport | Links supported | Supported by | Bearer | Overview |
|---|---|---|---|---|
| Connection based Isochronous Stream | stream (framed or unframed) LE-S or LEF | LE isochronous; physical link | LE | Unidirectional or bidirectional transport in a point to point connection for transferring isochronous data. |
| Broadcast Isochronous Stream | Stream (framed or unframed) LE-S (or LE-F) and Control LEB-C) | LE isochronous physical link | LE | Unidirectional transport for broadcasting data in a point to multipoint configuration and unidirectional transport for controlling the broadcast data |

FIG. 18 is a diagram illustrating a packet format for each layer to which the present disclosure is applicable.

FIG. 18(*a*) illustrates an example of link layer (LL) packet format. The LL packet format may include a preamble, an access address (or an access code), a PDU, and a Cyclic Redundancy Code (CRC) field. The preamble may have a size of 1 octet, may be used for frequency synchronization, symbol timing estimation, automatic gain control (AGC) training, and the like at the receiving side, and may be configured with a predetermined bit sequence. The access the data field. Data fields may contain attributes. An attribute is a unit of arbitrary data, and may include, for example, data at various points in time in various states of the device, such as location, size, weight, temperature, and speed.

An attribute may have a format including an attribute type, an attribute handle, an attribute value, and an attribute permission.

The attribute type may include a value indicating the type of attribute data identified by a Universally Unique Identifier (UUID).

The attribute handle may contain a value assigned by the server to identify attribute data.

The attribute value may include the value of attribute data.

Attribute permission may be configured by GATT (Generic ATTribute profile), and may include a value indicating the type of allowed access (e.g., whether it can read/write, whether encryption is required, whether authentication is required, whether authorization is required, etc.) to the corresponding attribute data.

In point of view of an Attribute protocol (ATT)/Generic Attribute Profile (GATT), a device may serve as a server and/or a client. The server may serve to provide attributes and related values, and the client may play a role of discovering, reading, or writing attributes on the server.

In ATT/GATT, it may support the transmission and reception of attribute data between the server and the client. For this, the PDU supported by the ATT protocol may include six method types, that is, request, response, command, notification, indication, and confirmation.

A request is sent from the client to the server, and a response from the server is required. A response is sent from the server to the client, and is sent when there is a request from the client. A command is sent from the client to the server, and no response is required. A notification is sent from the server to the client, and confirmation is not required. An indication is sent from the server to the client, and confirmation of the client is required. A confirmation is sent from the client to the server, and is sent when there is an instruction from the server.

In addition, GATT may support various profiles. The structure of the GATT-based profile may be described as a service (service) and characteristics (characteristics). A device may support one or more profiles. One profile may include zero or one or more services. A plurality of profiles may use the same service. One service may include one or more characteristics. A characteristic means a data value that is the subject of read, write, indicate, or notify. That is, a service may be understood as a data structure used to describe a specific function or feature, and a service that is a combination of characteristics may indicate an operation performed by a device. All services are implemented by the server and may be accessed by one or more clients.

Figure 19:
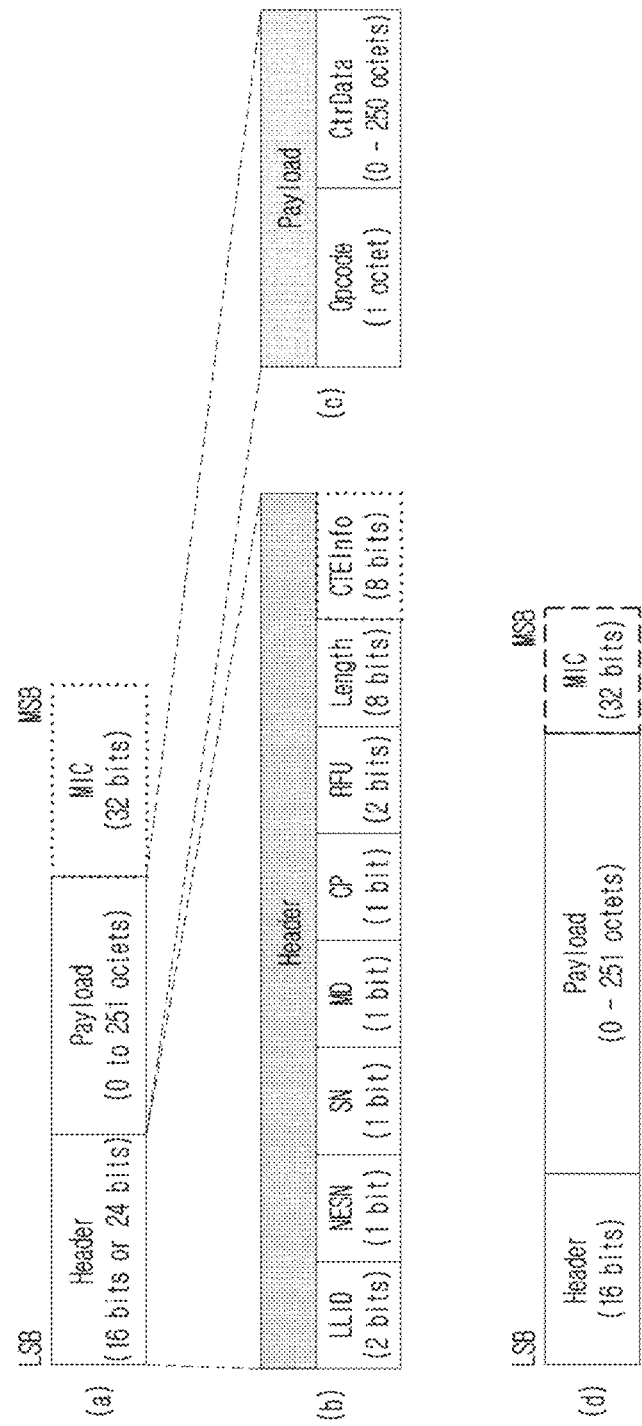
FIG. 19 is a diagram illustrating examples of a data unit format to which the present disclosure is applicable.

FIG. 19 is a diagram illustrating examples of a data unit format to which the present disclosure is applicable.

FIG. 19(a) illustrates an exemplary format of a data physical channel PDU (Protocol Data Unit). The data channel PDU may be used to transmit a packet on the data physical channel (e.g., channel number 0 to 36). The data physical channel PDU includes a 16 or 24 bit length header and a variable size (e.g., 0 to 251 octet size) payload, and may further include a Message Integrity Check (MIC) field. For example, the MIC field may be included in the case of an encrypted link layer connection in which the payload field size is not 0.

As shown in FIG. 19(b), the header fields may include LLID (Logical Link Identifier), NESN (Next Expected Sequence Number), SN (Sequence Number), MD (More Data), CP (CTEInfo Present), RFU (Reserved). for Future Use). The RFU corresponds to a part reserved for future use when necessary, and its value may be usually filled with 0. Also, according to the value of the CP field, the header field may further include a Constant Tone Extension Information (CTEInfo) subfiel-d. In addition, the Length field may indicate the size of the payload, and when the MIC is included, it may indicate the length of the payload and the MIC.

FIG. 19(c) illustrates an exemplary format of an LL Control PDU. The LL Control PDU may correspond to a data physical channel PDU used to control link layer connection. The LL Control PDU may have a fixed value according to an operation code (Opcode). The Opcode field may indicate the type of the LL Control PDU. The control data (CtrData) field may have various formats and lengths specified by the Opcode.

For example, the Opcode of the LL Control PDU may have a value (e.g., 0x1F, 0x20, 0x21, 0x22, . . . ) indicating one of LL_CBIS_REQ, LL_CBIS_RSP, LL_CBIS_IND, LL_CBIS_TERMINATE_IND, LL_CBIS_SDU_CONFIG_REQ, and LL_CBIS_SDU_CONFIG_RSP.

When the opcode indicates LL_CBIS_REQ, the CtrData field may include information necessary for a CBIS request together with CBISS identification information and CBIS identification information. Similarly, in each case where the Opcode indicates one of LL_CBIS_RSP, LL_CBIS_IND, LL_CBIS_TERMINATE_IND, LL_CBIS_SDU_CONFIG_REQ, LL_CBIS_SDU_CONFIG_RSP, the CtrData may include information required for a CBIS response, a CBIS indication, a CBIS termination indication, a CBIS Service Data Unit (SDU) setup request, and a CBIS SDU setup response.

FIG. 19(d) illustrates an example of audio data PDU format.

Audio data PDU may be CBIS PUD or broadcast isochronous PDU. When used in a CBIS stream, the audio data PDU may be defined as CBIS PDU. When used in a broadcast isochronous PDU, the audio data PDU may be defined as broadcast isochronous PDU.

The audio data PDU may include a 16-bit length header field and a variable length payload field. Also, the audio data PDU may further include a MIC field.

In the case of a CBIS PDU, the format of the header field may include 2-bit LLID, 1-bit NESN, 1-bit SN, 1-bit Close Isochronous Event (CIE), 1-bit RFU, 1-bit Null PDU Indicator (NPI), 1-bit RFU, 9-bit Length subfield.

In the case of broadcast isochronous PUD, the format of the header field may include 2-bit LLID, 3-bit Control Subevent Sequence Number (CSSN), 1-bit Control Subevent Transmission Number (CSTF), 2-bit RFU, and 8-bit Length subfield.

The payload field of audio data PDU may include audio data.

Figure 20:
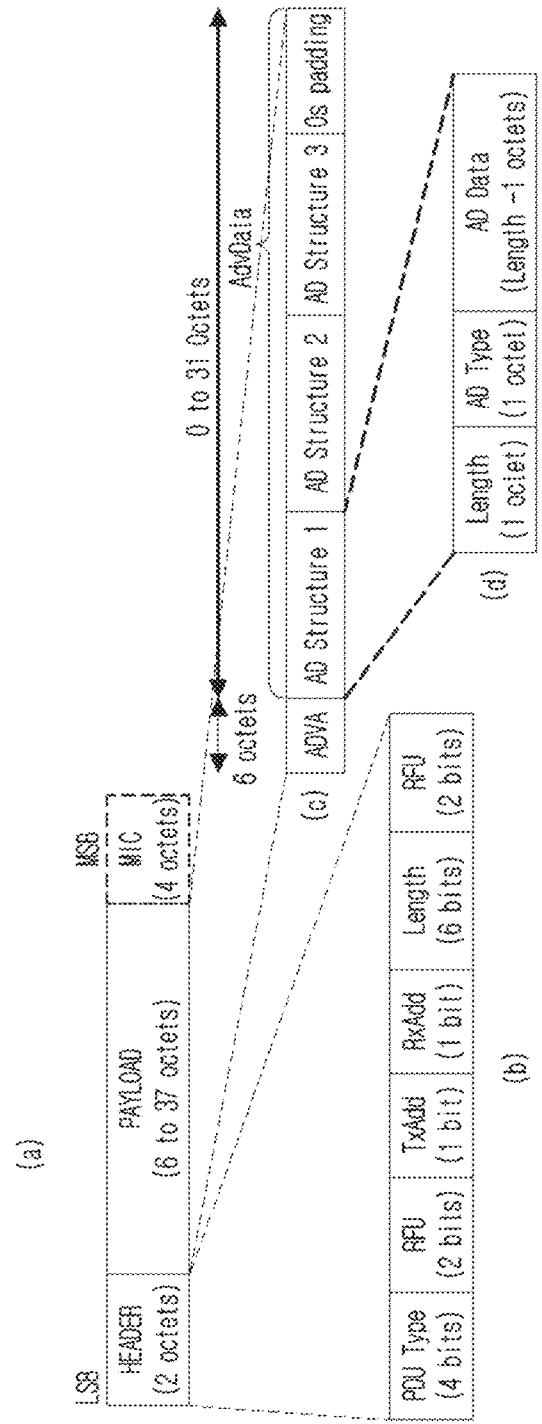
FIG. 20 is a diagram illustrating examples of an advertisement unit format to which the present disclosure is applicable.

FIG. 20 is a diagram illustrating examples of an advertisement unit format to which the present disclosure is applicable.

FIG. 20(a) shows an exemplary format of an Advertising Physical Channel PDU (Protocol Data Unit). The advertising channel PDU may be used to transmit packets on an advertising physical channel (e.g., channel numbers 37, 38, 39). The advertising channel PDU may consist of a header of 2 octets and a payload of 6 to 37 octets.

FIG. 20(b) shows an exemplary format of a header of an advertising channel PDU. The header may include a PDU type, a Reserved for Future Use (RFU), a transmission address (TxAdd), a reception address (RxAdd), a length (Length), and an RFU field. The length field of the header may indicate the size of the payload.

FIG. 20(c) shows an exemplary format of a payload of an advertising channel PDU. The payload may include an Advertiser Address (AdvA) field with a length of 6 octets and an AdvData field with a length of 0 to 31 octets. The AdvA field may include a public address or a random address of the advertiser. The AdvData field may include zero or more advertising data (AD) structures, and padding if necessary.

FIG. 20(d) shows a format of one AD structure. The AD structure may include three fields. A length field may indicate a length of a AD Data field. That is, a value obtained by subtracting 1 from the value indicated by the length field may correspond to the length of the AD Data field. The AD Type field may indicate a type of data included in the AD Data field. The AD Data field may include advertising data provided from a host of an advertiser.

Hereinafter, an adaptive audio processing method according to the present disclosure will be described.

Figure 21:
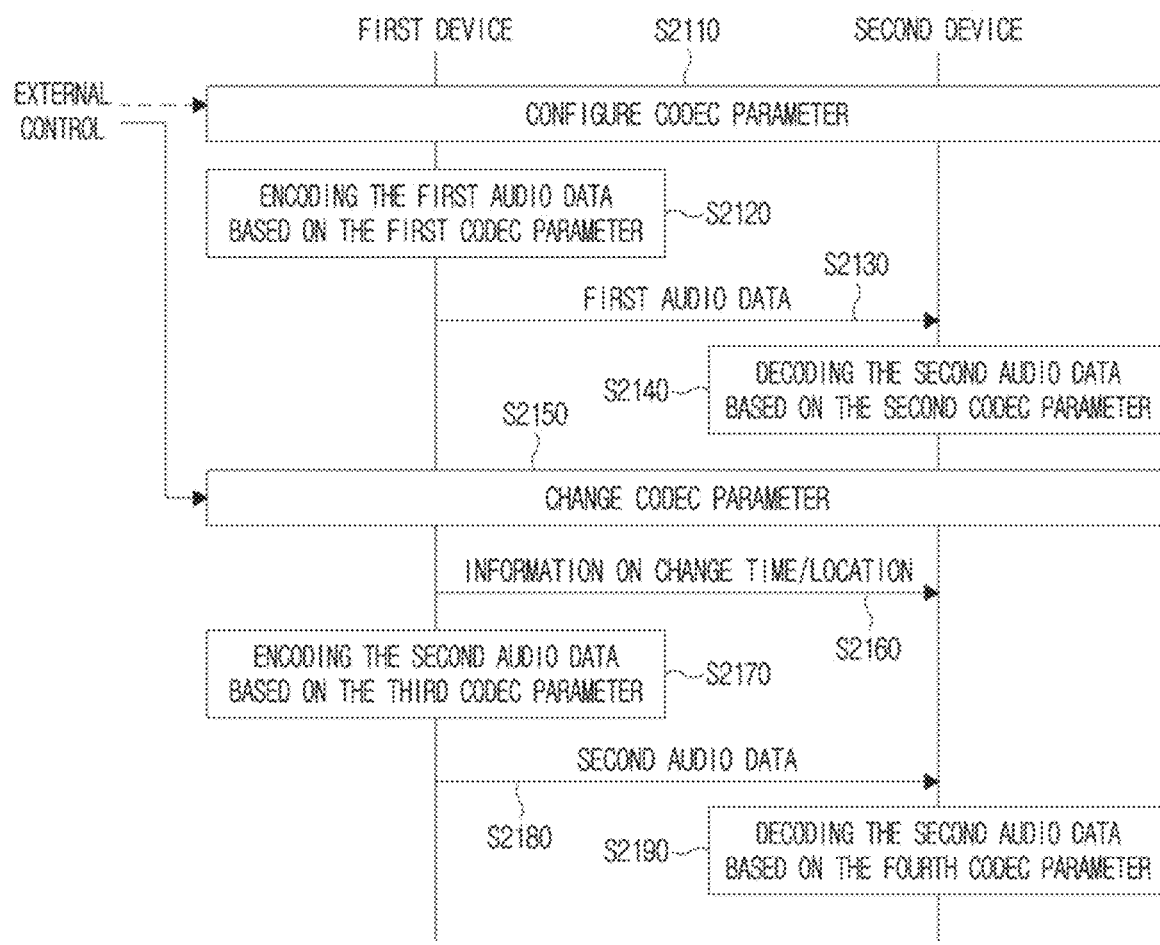
FIG. 21 is a diagram for describing an audio encoding and audio decoding method to which the present disclosure is applicable.

FIG. 21 is a diagram for describing an audio encoding and audio decoding method to which the present disclosure is applicable.

In step S2110, a codec parameter for at least one of the first device or the second device may be configured.

The codec parameter may include at least one of bandwidth, bit rate, sampling rate, frame duration (or frame length), frame size (or frame interval), data size (or data unit size), location, channel, the number of channels, stream, the number of streams, group, or isochronous links. That is, the codec parameter means one parameter related to the codec or a set of a plurality of parameters.

A codec parameter configured to the first device and the second device may be the same or different. That is, the first codec parameter may be configured to the first device and the second codec parameter may be configured to the second device. Alternatively, some of the first codec parameter and the second codec parameter may be configured in common and some may be configured separately. Also, the first codec parameter and the second codec parameter may have a correlation or a mapping relationship.

The codec parameter may be configured to a fixed value or may be configured to a variable value.

The codec parameter configured to a fixed value may correspond to a default value determined when the device is manufactured or according to a predetermined rule.

The codec parameter configured to a variable value may be configured by external control. The external control may include determining a codec parameter based on external factors (e.g., network environment, ambient noise level, location characteristics, content type, service type, link quality, etc.).

In step S2120, the first device may encode the first audio data based on the first codec parameter.

A data unit may be generated through encoding of audio data. Also, depending on the encoding procedure, data units may be mapped to one or more of a location, a channel, a stream, a group, or an isochronous link. For example, input data (e.g., a PCM signal) mapped to each of one or more locations or channels may be encoded according to a codec parameter to generate a data unit (e.g., a BLEAC format signal). The one or more data units may be mapped and transmitted on one or more of a stream, a group, or an isochronous link.

In step S2130, the first device may transmit the first audio data (i.e., encoded data unit) to the second device.

In step S2140, the second device may decode the first audio data based on the second codec parameter.

Audio data may be obtained from a data unit through decoding of the audio data, and the obtained audio data may be rendered (or reproduced or streamed).

Depending on the decoding procedure, a data unit may be mapped to one or more of a location, a channel, a stream, a group, or an isochronous link. For example, each of one or more data units (e.g., BLEAC format signals) mapped to a stream, group, or isochronous link and received may be decoded according to a codec parameter. The decoded audio data may be obtained as output data (e.g., a PCM format signal) mapped to each of one or more locations or channels.

In step S2150, a codec parameter for at least one of the first device or the second device may be changed.

Changes in a codec parameter may be derived by external control. For example, codec parameters changed in the first device and the second device may be the same or different. That is, the first codec parameter configured to the first device may be changed and configured to the third codec parameter, and the second codec parameter configured to the second device may be changed and configured to the fourth codec parameter. Alternatively, some of the third codec parameter and the fourth codec parameter may be configured in common and some may be set separately. Also, the third codec parameter and the fourth codec parameter may have a correlation or a mapping relationship.

The change of the codec parameter may be performed during one audio streaming or during a stream session. That is, configuring and changing codec parameters according to the present disclosure may be dynamically performed.

In addition, configuring and changing of codec parameters may be managed by an isochronous adaptive layer (ISOAL), which will be described later.

In step S2160, the first device may provide information on the change time or change location (hereinafter, change time/location information) to the second device.

The change time/location information may be related to a codec parameter changed by external control. That is, the change time/location information may be determined by external control.

For example, change time/location information may include one or more of information on when/where a codec parameter were changed, information on the time/location of the first data received by the second device based on the codec parameter before the change or information on the time/location of the second data received by the second device based on the changed codec parameter. That is, the change time/location information may correspond to information signaling a specific part of audio data that cannot be correctly received or decoded correctly (that is, an error is detected) in the second device according to a change in a codec parameter.

The second device may perform seamless audio data streaming based on the change time/location information.

In step S2170, the first device may encode the second audio data based on the third codec parameter.

In step S2180, the first device may transmit the second audio data to the second device.

In step S2190, the second device may decode the second audio data based on the fourth codec parameter.

Here, The second device may determine a time/location to which the second codec parameter is applied and a time/location to which the fourth codec parameter is applied based on the change time/location information obtained in step S2160. Alternatively, the second device may determine a data part that is not received or in which an error occurs due to a change in a codec parameter, based on change time/location information, and may perform seamless audio data streaming based on this.

In the above example, the first device may correspond to an encoder or a source device, and the second device may correspond to a decoder or a sink device.

Some or all of the above-described adaptive audio processing, in particular, an example of dynamically configuring/changing a codec parameter, may be applied to various embodiments of the present disclosure described below.

The dynamic codec parameter configuring described in the present disclosure may be based on a new Bluetooth audio codec (e.g., BLEAC). For example, the existing Bluetooth audio codec (e.g., Sub-Band Codec (SBC) applied by BR/EDR) does not support dynamically configuring/changing codec parameters (e.g., bit rate). In addition, in Bluetooth audio processing, a vendor-specific codec such as AAC (Advanced Audio Coding) or aptX (Audio Processing Technology X) codec may be supported, but even in this case, codec parameters (e.g., bit rate) does not support configuring/changing dynamically. On the other hand, the application of a new audio codec (e.g., BLEAC) having low energy and low complexity in BR/EDR and BLE is being discussed. In addition, in applying BLEAC, a method of dynamically and adaptively configuring/changing codec parameters is required. To this end, the design of an adaptive layer for applying BLEAC to Bluetooth communication is required. In addition, for the purpose of efficient transcoding, a specific method for dynamically and adaptively configuring/changing codec parameters in consideration of external factors (e.g., network environment, ambient noise level, location characteristics, content type, service type, link quality, etc.) is required.

Figure 22:
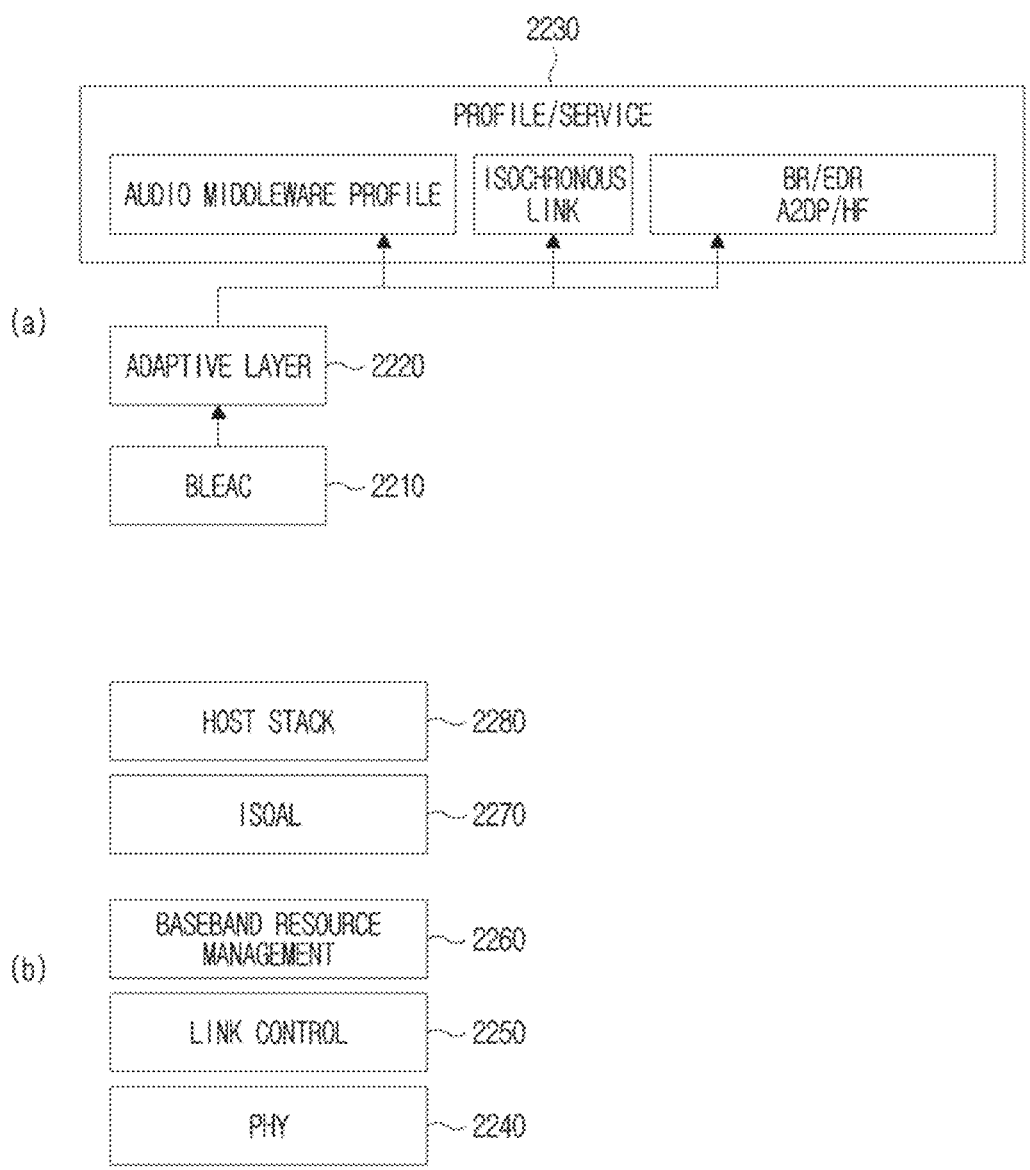
FIG. 22 is a diagram for describing an adaptive layer configuration for BLEAC to which the present disclosure is applicable.

FIG. 22 is a diagram for describing an adaptive layer configuration for BLEAC to which the present disclosure is applicable.

FIG. 22(a) shows an adaptive layer 2220 that dynamically/adaptively applies the codec parameters of the BLEAC 2210. The adaptive layer 2220 may dynamically/adaptively apply BLEAC codec parameters to various profiles or services 2230. For example, the profile or service 2230 in which the adaptive layer 2220 is involved includes audio middleware, an isochronous link (ISO link), A2DP (Advance Audio Distribution Profile), HF (Handsfree), BR/EDR, and the like.

FIG. 22(b) illustrates a layer stack in consideration of BLEAC adaptive layer. In the example of FIG. 22B, the adaptive layer may be configured in the form of an isochronous adaptive layer (ISOAL). ISOAL 2270 may be located between a lower layer (e.g., Bluetooth PHY 2240, link control 2250, baseband resource management 2260, etc.) and an upper layer (e.g., host stack 2280, etc.).

The BLEAC adaptive layer may support adaptively changing or configuring codec parameters (e.g., bandwidth, bit rate, sampling rate, etc.) related to audio processing.

In addition, super wideband speech (SWB) may be used in addition to currently available wideband speech (WB) in order to provide a better user experience. SWB may provide better audio quality compared to WB.

The adaptive layer according to the present disclosure may be designed to support a method of using BLEAC for encoding and decoding of multiple audio channels, and a method of transmitting data encoded by BLEAC in a packet through an audio stream. The adaptive layer may be expressed as a wrapper at the level of abstraction.

Also, BLEAC may be basically defined as a single-channel codec. When a plurality of channels are supported, individual BLEAC may be applied to each channel. In addition, the payload or transport format for BLEAC is not limitedly defined, and may be appropriately implemented depending on the purpose.

In the conventional Bluetooth audio processing, changing a codec or changing a codec parameter (e.g., bit rate) is not supported when transcoding is performed. Accordingly, in order to dynamically and adaptively change a codec or a codec parameter (e.g., bandwidth, bit rate, sampling rate), etc. in audio processing, it is necessary to define a time point or reference for such a change. For example, adaptive audio processing may be performed based on external factors such as a network bearer (3G, 4G, LTE, Wi-Fi, 5G, GSM, CDMA, 2G, WCDMA, etc.), Bluetooth link quality, content type, service type, ambient noise level, and location characteristics.

The main parameters related to QoS of BLEAC (i.e., BLEAC QoS parameters) may include SDU interval, isochronous (ISO) channel interval, packing, framing, maximum SDU size, number of retransmissions (ReTransmission Effort, RTE), transport latency, the number of sub-events (NSE), flush timeout (FT), burst number (BN), and the like.

In the present disclosure, the term codec parameter may include a QoS parameter unless a codec parameter and a QoS parameter are explicitly distinguished.

Here, the NSE may include the total number of sub-events for transmitting data PDUs in every ISO interval. The FT may include a maximum time interval in which the payload PDU may be transmitted or retransmitted. The BN may include the number of different data PDUs transmitted in the immediate part of the data sub-event.

The latency required for each service is as follows. Voice may require a latency of about 20 ms or less. Music playback audio may require a latency of about 100 ms or less. A movie/video (movie/video) may require a latency of less than 40 ms until audio rendering, and a total latency of less than 100 ms.

In addition, in the voice coding method of Continuously Variable Slope Delta modulation (CVSD), 1 bit per sample, that is, the sampling rate is 16 kHz, and the encoded audio may have a bit rate of 16 kbit/s (kbps).

Transport delay may be calculated as follows.

$$\text{For single direction:} 10 \text{ ms}*BN*(FT\text{-}1)+((M*10 \text{ ms}+15 \text{ bytes}*8)/2000+0.15 \text{ ms}*2+0.044 \text{ ms})*N*NSE$$

$$\text{For Bidirectional:} 10 \text{ ms}*BN*(FT\text{-}1)+(2*(M*10 \text{ ms}+15 \text{ bytes}*8)/2000+0.15 \text{ ms}*2)*N*NSE$$

Here, M is an encoded audio bit rate value in kbps units, and N represents the number of audio channels.

If the codec is different for each channel or the bitrate is different (e.g., as the audio bitrate encoded in K channels, $M\_k$ (here, k=1, 2, . . . , K) in the k-th channel If used), the transport delay may be calculated as follows.

$$10 \text{ ms}*BN*(FT\text{-}1)+((M\_1*10 \text{ ms}+15 \text{ bytes}*8)/2000+ (M\_2*10 \text{ ms}+15 \text{ bytes}*8)/2000+ \ldots +(M\_K*10 \text{ ms}+15 \text{ bytes}*8)/2000+0.15 \text{ ms}*2+0.044 \text{ ms}+)*N*NSE$$

When it is difficult for the calculated transport delay value to satisfy the latency requirement, the codec or bitrate may be adaptively changed for each channel, for example, the $M\_k$ value may be adaptively changed.

Meanwhile, in the audio clock and the Bluetooth controller clock, clock drift may be considered. For example, in order to specify independent audio clocks and Bluetooth controller clocks, parameters for simulating clock drift may be configured by verifying whether a data stream is transmitted even when the audio sample clock and the Bluetooth controller clock drift.

For example, among commands defined in the host controller interface (HCI) function, the HCI_LE_Set_CBISS_Parameters command may be used when adding or modifying CBISS to the controller. Specifically, the HCI_LE_Set_CBISS_Parameters command may be used by the master host to configure parameters for all CBISs related to CBISS in the controller. If CBISS is not activated, this command may be used to add or modify a new CBISS to the CBISS already configured in the controller.

The parameters included in this command may include CBISS identifier, SDU interval, sleep clock accuracy (SCA), method for sorting sub-events of multiple CBIS (i.e., packing), the number of CBIS, CBIS identifier, master to slave of (M_To_S)/slave to master (S_To_M) maximum SDU size, M_To_S/S_To_M PHY characteristics, M_To_S/S_To_M transport latency, M_To_S/S_To_M number of retransmissions (RTE), and the like. Here, the M_To_S parameter may be the same as the S_To_M parameter, the PHY may be LE 2M, and the SCA may be 0.

Table 6 below exemplarily shows the correlation between the audio clock sample rate, codec, encoded bitrate, audio frame interval, SDU size, the number of streams from the client to the server, and the number of streams from the server to the client.

TABLE 6

| Test number | audio clock sample rate (kHz) | codec | encoded bit rate (kbps) | audio frame interval (ms) | SDU size (octect) | the number of streams (client to server) | the number of streams (server to client) |
|---|---|---|---|---|---|---|---|
| 1 | 16 | BLEAC | 32 | 10 | 40 | 1 | 1 |
| 2 | 32 | BLEAC | 64 | 10 | 80 | 2 | 1 |
| 3 | 44.1 | BLEAC | 95.55 | 10.884 | 130 | 2 | 0 |
| 4 | 48 | BLEAC | 96 | 10 | 120 | 2 | 0 |
| 5 | 48 | BLEAC | 124 | 10 | 155 | 2 | 0 |
| 6 | 48 | BLEAC | 320 | 10 | 400 | 1 | 0 |

BLEAC may support low complexity, long term prediction, low delay, and scalable sampling rate. In addition, BLEAC may increase audio quality and decrease bitrate. In this regard, in MPEG-4 AAC, HE-AAC may improve compression efficiency in the frequency domain by using SBR (Spectral band replication), and HE-AACv2 is parametric stereo (DAB+) according to DAB+(Digital Audio Broadcasting) recommendation. PS), and it may refer to the conversion from 128 kbit/s to 12 kbit/s in xHE-AAC. Also, in MPEG-D audio coding, it may be referred to that USAC (Unified Speech and Audio Coding) and DRC (Dynamic Range Control) are supported. Here, DRC or compression means reducing or compressing the dynamic range of an audio signal by reducing the volume of a loud sound or amplifying a small sound. In addition, many network providers (e.g., telecommunication operators) may refer to supporting SWB coding technology that provides a bandwidth of 16 kHz wider than the existing 8 kHz, for example, 3GPP Enhanced Voice Services (EVS).

According to the present disclosure, a method of configuring/changing a codec or a codec parameter according to an external factor in relation to Bluetooth audio processing may be supported. For example, when a user gets into a vehicle while connected to a phone speaker in the home and changes the connection to an audio device (e.g., AVN (Audio Visual Navigation)) provided in the vehicle, a scenario of changing a codec or a codec parameter may be considered in consideration of the characteristics of a connected device. For example, by detecting changes in external factors without user manipulation or input (e.g., according to specific content, according to a specific service, according to a specific location, according to a network bearer change, according to a change in Bluetooth link quality,) (i.e., by external control), a codec parameter (e.g., DRC or bitrate) may be automatically switched.

Hereinafter, embodiments for adaptive audio processing according to the present disclosure will be described.

Figure 23:
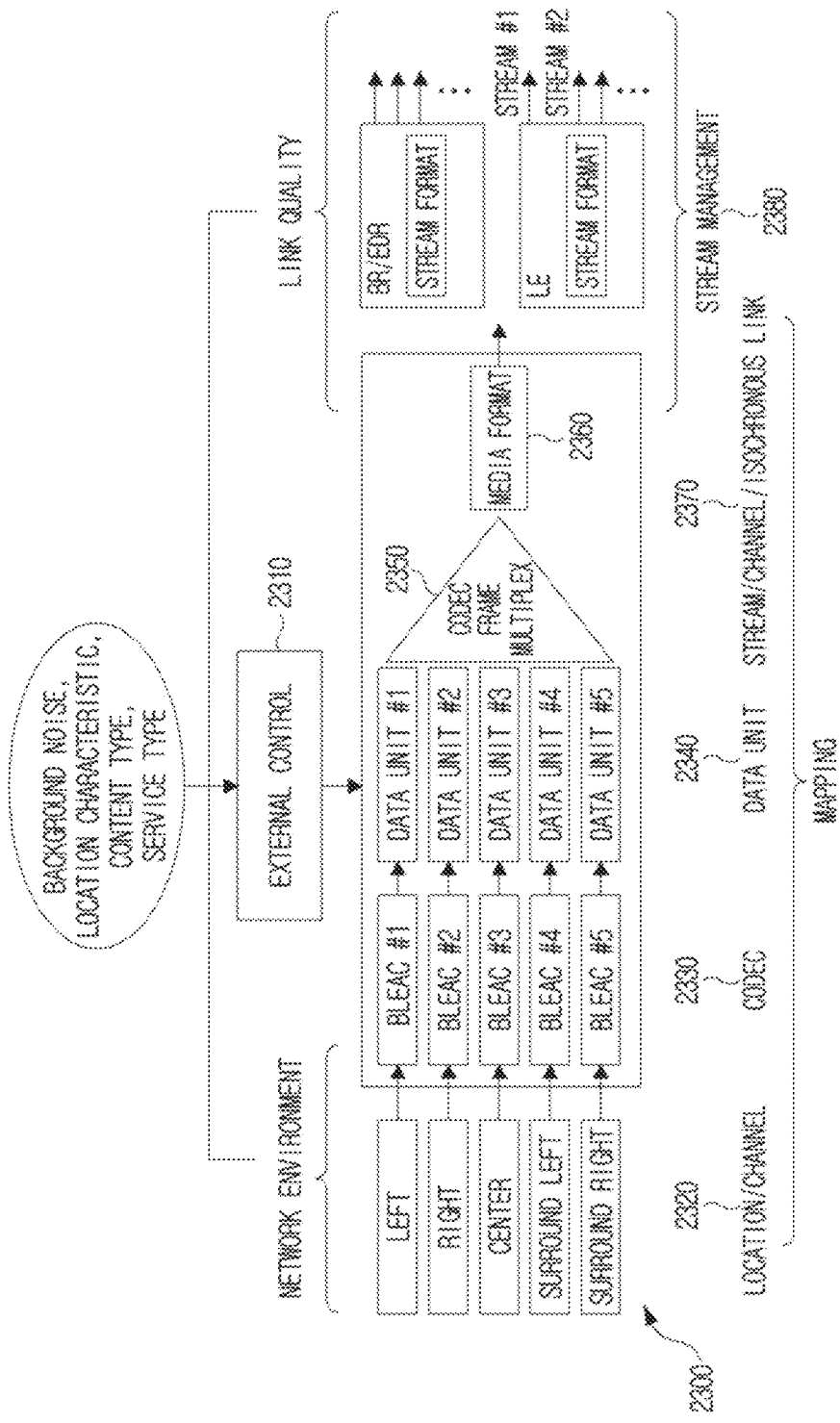
FIG. 23 is a diagram illustrating conceptually BLEAC adaptive layer configuration to which the present disclosure is applicable.

FIG. 23 is a diagram conceptually illustrating a BLEAC adaptive layer structure to which the present disclosure is applicable.

The adaptive layer 2300 may include an external control 2310 function/module that dynamically/adaptively configures/changes codec parameters based on external factors (e.g., ambient noise, place characteristics, content type, service type, network environment, link quality, etc.). Alternatively, the external control 2310 may not be included in the adaptive layer 2300, and a function/module for applying configuration by the external control 2310 may be included in the adaptive layer 2300.

Hereinafter, consideration of the network environment and link quality as an external factor is exemplarily described, but the external factor is not limited to the above-described examples. That is, in the present disclosure, dynamically/adaptively configuring/changing a codec parameter based on various external factors is referred to as an external control 2310.

Adaptive layer 2300 may configure/change a codec parameter related to one or more of location/channel 2320, codec 2330, data unit 2340, multiplexing 2350, media format 2360, stream/channel/isochronous link 2370, or stream management 2380', based on the external control 2310.

For example, when the adaptive layer 2300 according to the present disclosure transfers audio data from the first device to the second device, the adaptive layer 2300 may include a function of adaptively changing audio processing based on an external factor other than a link between the first and second devices.

For example, the adaptive layer 2300 according to the present disclosure may be configured on the first device side when the first device receives audio data from the third device and the first device transmits the audio data to the second device. Here, the first device may convert audio data received from the third device into audio data suitable for the second device. For example, a phone device (first device) that is a client that receives audio data from a server (third device) may transmit audio data to a headset device (second device) connected to the phone device (first device).

Such audio data conversion processing may be affected by two aspects of the environment (i.e., external factors). That is, various parameters for processing audio data transferred from the first device to the second device may be adaptively changed based on a change in the environment in which audio data is transmitted from the first device to the second device (that is, the first link environment) and/or the environment in which audio data is transmitted from the third device to the first device (that is, the second link environment).

The change of the first link environment may be determined by the first device or may be determined by the second device and fed back to the first device. For example, increase/decrease in quality, bandwidth, transmission rate, etc. of an audio stream/link that the second device receives from the first device, and increase/decrease in rendering quality requested by the second device, etc. may be determined by the first device or the second device.

The change of the second link environment may be determined by the first device, or may be determined by the third device and provided to the first device. For example, increase/decrease in quality, bandwidth, transmission rate, etc. of an audio stream/link that the first device receives from a third device, and increase/decrease in rendering quality requested by the first device, etc. may be determined by the third device or the first device.

A change to one or more of these first or second link environments may be compared with a preconfigured threshold to determine whether an adaptive configuration of a codec parameter is required. In addition, the preconfigured threshold may be configured to multiple levels. In addition, codec parameters corresponding to each of the multiple levels may be shared in advance between the first and second devices. Accordingly, when it is determined that the first or second link environment is changed from the first level to the second level, the codec parameter mapped to the first level may be changed to the codec parameter mapped to the second level.

In addition, although individual parameters corresponding to each level of link environment change may be preconfigured, a set of parameters corresponding to each level may be preconfigured. In this case, all or part of the information included in the codec parameter configured to be changed may be transmitted from the first device to the second device, or only identification information indicating the codec parameter configured to be changed may be transmitted.

In addition, the codec individual parameter or parameter set to be changed may be explicitly or directly indicated by its value, or may be indicated implicitly based on a preconfigured mapping relationship between the parameter/parameter set and predetermined information (e.g., identifier or other purpose indication information).

In addition, the level for the link environment may be changed from a high level to a low level, and may be changed from a low level to a high level. In addition, the level change may be performed sequentially, but may be changed to a level with a difference of two or more at a time.

In addition, based on whether the change of the level for the link environment continues for a predetermined time or number of times, whether to change the codec parameter may be determined. That is, if the changed level is maintained for less than a predetermined time or number of times, existing codec parameters may be maintained, and when the changed level is maintained for a predetermined time or number of times or more, the codec parameter may be adaptively determined according to the changed level.

Also, the change of the codec parameter may be performed based on a predetermined cycle. That is, even in a situation in which the link environment is frequently changed, when the codec parameter is changed too frequently, the user's sensible-performance may be reduced. Accordingly, by configuring a minimum value for two successive codec parameter change opportunities, the changed codec parameter may be maintained for at least a time corresponding to the minimum value.

In addition, in order to respond to a situation in which the link environment is frequently changed, when the audio data client receives audio data from the audio data server through the network, it may to obtain in advance a section preceding the current streaming section of audio data by a predetermined length. Accordingly, before the audio data client transmits the stream to the audio reproduction device through transcoding, a buffering time is secured to change the codec parameter adaptively to the change of the link condition on the network side, so that the user may change the audio rendering quality may reduce the number of experiences.

As described above, various parameters for processing audio data to be transmitted from the first device to the second device may be configured or changed based on a change in one or more of the first or second link environment. Parameters for audio data processing may include a codec type, a bit rate, a sampling rate, a data unit format, a stream type, a channel type, a link type, and the like. In addition, parameters for audio data processing may include the above-described BLE QoS parameters (e.g., SDU interval, ISO channel interval, packing, framing, maximum SDU size, RTE, transport latency, NSE, FT, BN, etc.).

The function of the adaptive layer 2300 according to the present disclosure may support mapping between a location/channel 2320, a codec 2330 or a codec parameter, a data unit 2340, and a stream/channel/link 2370. Here, the data unit corresponds to a unit of audio data encoded for each audio location/channel 2320 and may have a layer-dependent data format.

As in the example of FIG. 23, the external control 2310 of the adaptive layer 2300 may include a part for determining a network condition and a part for determining a stream delivery situation.

The network condition may be determined based on a network bearer type, a service type, a content type, and the like. Meanwhile, the stream delivery status may be determined based on Bluetooth link quality and the like.

In the case of an audio device system configured with 5CH, audio data may be configured for each of five audio channels (or audio locations) 2320 of left, right, center, surround left, and surround right. Audio data may be encoded by BLEAC (ie, single-channel codec) 2330 for each audio location/channel. For example, BLEACs #1 to #5 may each correspond to one audio location/channel. Here, the plurality of BLEACs may be configured as individual codec modules, or may be configured by encoding methods based on different codec parameters in one codec module. As a result of encoding for the audio data, data units #1 through #5 2340 may be generated.

Here, an appropriate codec may be determined adaptively based on a network situation. Determining the codec adaptively may include determining one or more of a maximum supportable codec type or a codec parameter according to a network situation. In addition, the same codec type/codec parameter may be applied to each audio channel, or a different codec type/codec parameter may be applied.

The generated data unit 2340 may be configured in a predetermined media format 2360 through multiplexing 2350 according to codec frames. In the example of FIG. 23, it is assumed that a plurality of media formats exist. For example, media format #1 and media format #2 may be defined. Data units #1 to #3 may be mapped to media format #1, and data units #4 and #5 may be mapped to media format #2. Media format 2360 may be mapped to stream/channel/isochronous link 2370. For example, by the stream management 2380, a data unit corresponding to the media format #1 may be mapped to the stream #1, and a data unit corresponding to the media format #2 may be mapped to the stream #2.

Here, the media format 2360 applied to the data unit 2340 may be adaptively determined according to a stream delivery situation. For example, if the quality of a Bluetooth link to which stream #1 is mapped is changed, a codec type/codec parameter may be adaptively changed for an audio location corresponding to a data unit mapped to stream #1. According to the determined media format 2360, the multiplexed 2350 data unit 2340 may be mapped to an audio stream, an audio channel, or an isochronous link 2370.

That is, audio data for a specific audio location/channel 2320 may be encoded according to a specific codec type/codec parameter 2330 adaptively determined according to a network situation by the external control 2310 to be generated as a data unit 2340. The data unit 2340 may be mapped (or multiplexed) to be transmitted through a specific media format 2360 and a stream/channel/isochronous link 2370 that are adaptively determined according to the stream delivery situation by the external control 2310

The adaptive layer 2300 of the present disclosure may be applied to the BR/EDR mode and may be applied to the LE mode. A stream format is determined according to a supported rate for each mode, and a stream configured according to this may be delivered through a link.

Figure 24:
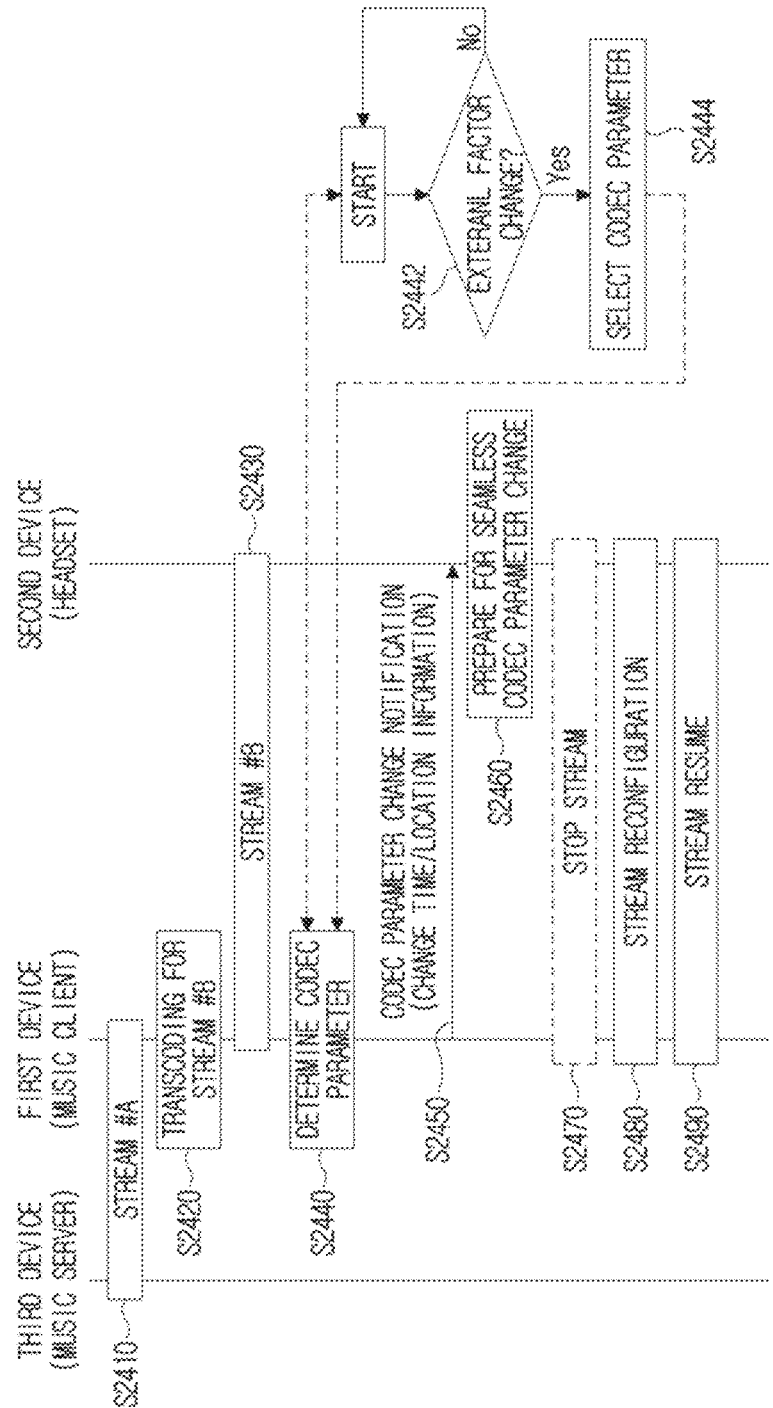
FIG. 24 is a flowchart illustrating an example of changing a codec parameter configuration to which the present disclosure is applicable.

FIG. 24 is a flowchart illustrating an example of changing a codec parameter setting to which the present disclosure is applicable.

In the example of FIG. 24, it is assumed that a music client receiving an audio stream (e.g., stream #A) from a music server through a network is a smartphone.

In step S2410, the music client as the first device may receive stream #A from the server as the third device.

In step S2420, the first device (music client) may convert (i.e., transcode) stream #A into an audio stream (e.g., stream #B) suitable for the Bluetooth link between itself and the headset which is the second device.

In step S2430, the first device may transmit the transcoded stream #B to the second device.

As such, when audio streaming is performed through a network, audio quality may vary according to a network situation between the first device and the third device. Conventionally, in a situation in which the audio is transmitted from the first device to the second device, a method for supporting a codec parameter change when the network situation between the first device and the third device changes has not been prepared.

In this example, an operation of changing the codec parameter configuring adaptively to a change of an external factor (e.g., network condition) will be described.

While stream #B is being transmitted from the first device to the second device, the first device may dynamically/adaptively determine a codec parameter in step S2440.

As a specific example of step S2440, in step S2442, the first device may determine whether an external factor (e.g., a network situation with the third device) is changed. For example, the external factor change may include a change in a network bearer type, a change in a content type streamed from the network, a change in a codec type (e.g., a codec type provided by a telecommunication company) applied to streaming from the network, and a service type and the like.

If it is determined that the external factor has been changed, in step S2444, the first device may adaptively select a codec type/codec parameter appropriate to the changed external factor.

The selection of codec type/codec parameters may include determining one or more of bandwidth, bit rate, sampling rate, frame duration (or frame length), frame size (or frame interval), data size (or data unit size), location identifier, channel identifier, the number of channels, a stream identifier, the number of streams, a group identifier, or an isochronous link identifier. Also, the selection of the codec parameter may further include selecting a frequency, a bit pool, and the like. In addition, the codec parameter may further include selecting the aforementioned QoS parameter.

When the codec type/codec parameter is determined according to the change of the external factor in step S2440, the first device may notify the change of the codec parameter to the second device in step S2450. Here, the codec parameter change notification may include change time/location information. For example, the change time/location information may be configured in a content pointer method.

Accordingly, the first device and the second device may change the configuration to a new codec type/codec parameter, respectively.

In step S2460, the second device may prepare for a seamless codec type/codec parameter change. For example, when the first device and the second device support on-the-fly codec type/codec parameter change during streaming, the codec type/codec parameter may be changed in a seamless way without stopping streaming.

If not, the existing stream is paused in step S2470, stream reconfiguration is performed according to the changed codec type/codec parameter in step S2480, and then the stream can be resumed in step S2490.

In this process, change time/location information may be used in order not to give the user an experience in which streaming is interrupted. For example, the change time/location information may include the last location and time of audio data received with the codec before the change, and/or the first location and time of the audio data received with the codec after the change. Accordingly, the second device may prevent interruption of streaming by identifying the time/location of data that is not received or cannot be processed due to an error.

Changes in external factors in the present disclosure are not limited to changes in network conditions, and the scope of the present disclosure may include dynamic/adaptive changes in codec parameter due to a change in the stream delivery situation through the Bluetooth link between the first device and the second device, external factors such as content, service, place, and surrounding conditions, or changes in various external factors not mentioned For example, the determination of the codec parameter of step S2440 of FIG. 24 may be performed based on link quality change information fed back from the second device or may determine a change in link quality to the second device by the first device itself. Alternatively, when streaming is to be provided to a new device other than the second device, whether to change the codec parameter may be determined based on a codec type supported by the new device, link quality with the new device, and the like.

Figure 25:
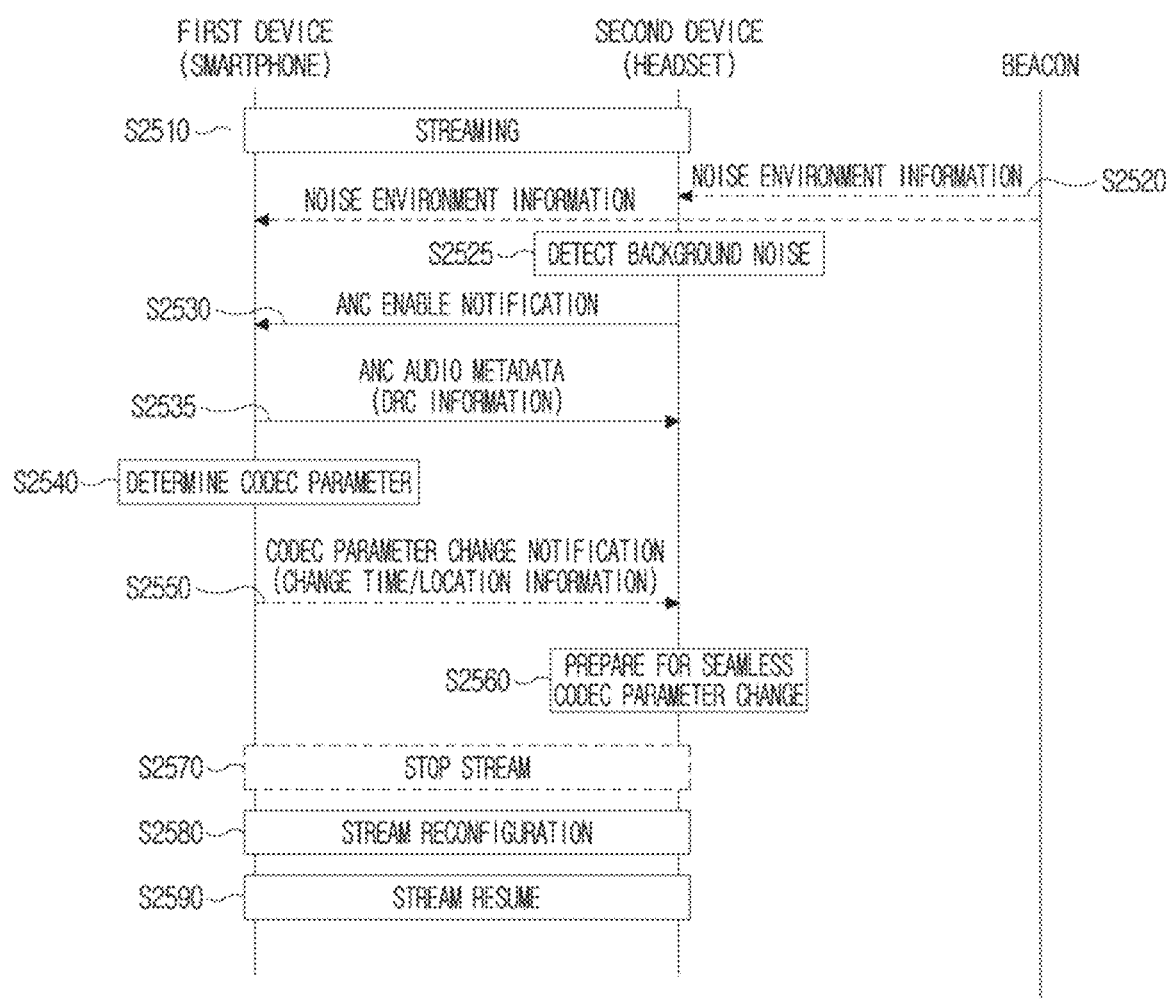
FIG. 25 is a diagram for describing an example of automatic codec parameter configuration to which the present disclosure is applicable.

FIG. 25 is a diagram for describing an example of automatic codec parameter configuration to which the present disclosure is applicable.

The example of FIG. 25 is for a case where an external factor that is the basis of external control for codec parameter configuration/change is ambient noise.

Streaming may be performed from the first device to the second device in step S2510.

In step S2520, information on a noisy environment from a beacon during streaming may be transmitted to one or more of the first device and the second device.

In step S2525, the second device may sense a surrounding noise environment through a microphone mounted on the second device. In this case, active noise cancellation (ANC) may be automatically enabled in the second device.

Alternatively, when the first device or the user senses a surrounding noise environment through the first device, ANC of the second device may be enabled by an instruction of the first device or a user's manipulation. For example, the built-in MPEG-D function of xHE-AAC allows the user to select the DRC (Dynamic Range Control) effect type noise environment in the player settings menu. Accordingly, the loudness of the audio may be boosted and DRC may be applied.

In step S2530, when ANC is enabled in the second device, the second device may transmit an ANC enable notification message to the first device.

In step S2535, the first device may transmit ANC audio metadata necessary for enabling the ANC function of the second device to the second device for currently streaming audio. The ANC audio metadata may include DRC information.

In step S2540, the first device may dynamically/adaptively determine a codec parameter suitable for changing an external factor (e.g., ambient noise).

As a specific example of step S2540, similar to step S2442 of FIG. 24, the first device may determine whether an external factor (e.g., ambient noise environment) is changed.

When it is determined that the external factor has been changed, similarly to step S2444 of FIG. 24, the first device may adaptively select a codec type/codec parameter appropriate to the changed external factor.

The selection of codec type/codec parameters may include determining at least one of bandwidth, bit rate, sampling rate, frame duration (or frame length), frame size (or frame interval), data size (or data unit size), location identifier, channel identifier, the number of channels, a stream identifier, the number of streams, a group identifier, or an isochronous link identifier. Also, the selection of the codec parameter may further include selecting a frequency, a bit pool, and the like. In addition, the codec parameter may further include selecting the aforementioned QoS parameter.

When the codec type/codec parameter is determined according to the change of the external factor in step S2540, the first device may notify the change of the codec parameter to the second device in step S2550. Here, the codec parameter change notification may include change time/location information. For example, the change time/location information may be configured in a content pointer method.

Accordingly, the first device and the second device may change the configuration to a new codec type/codec parameter, respectively.

Steps S2560 to S2590 are similar to steps S2460 to S2490 in the example of FIG. 24, and thus overlapping descriptions are omitted.

Figure 26:
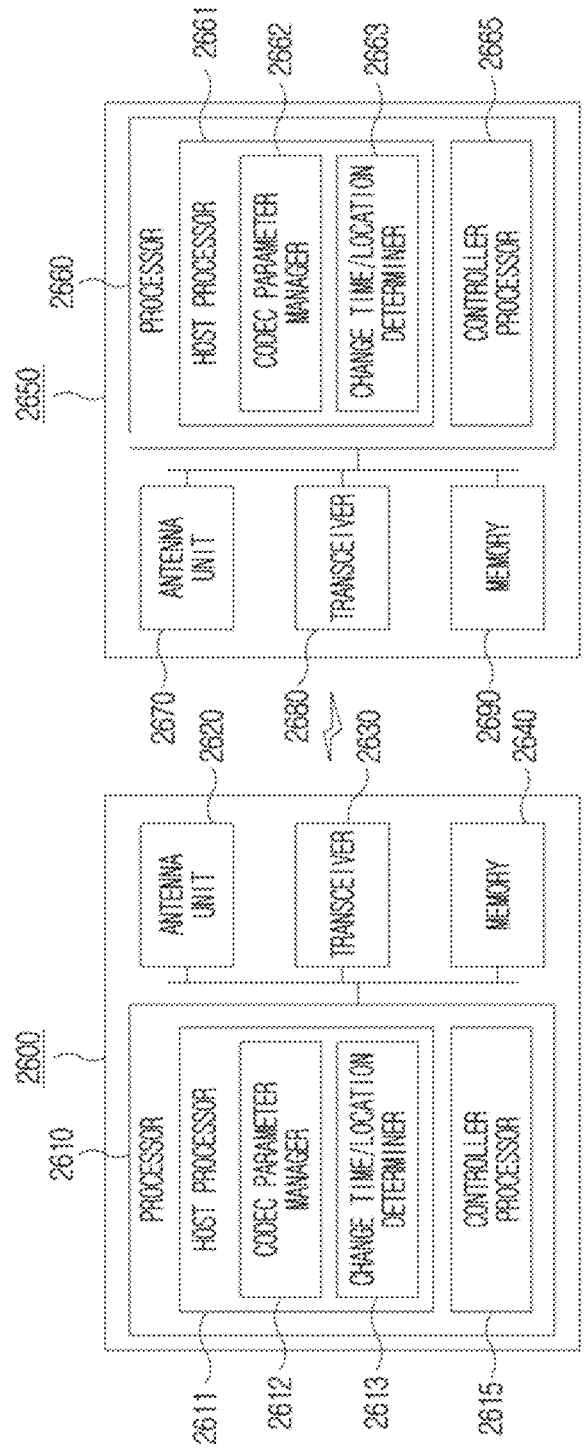
FIG. 26 is a diagram illustrating configurations of a first device and a second device to which the present disclosure may be applied.

FIG. 26 is a diagram illustrating a configuration of the first device and the second device to which the present disclosure is applicable.

The first device 2600 may include a processor 2610, an antenna unit 2620, a transceiver 2630, and a memory 2640.

The processor 2610 may perform baseband-related signal processing and may include a host processor 2611 and a controller processor 2615. The host processor 2611 and the controller processor 2615 may exchange information through HCI. The host processor 2611 may process operations such as L2CAP, ATT, GATT, GAP, and LE profile layers. The controller processor 2615 may process operations such as LL and PHY layers. The processor 2610 may control the overall operation of the first device 2600 in addition to performing baseband-related signal processing.

Antenna unit 2620 may include one or more physical antennas. The transceiver 2630 may include RF (Radio Frequency) transmitter and RF receiver. The memory 2640 may store information processed by the processor 2610 and software, an operating system, and an application related to the operation of the first device 2600, and may include components such as a buffer and the like.

The processor 2610 of the first device 2600 may be configured to implement an operation of the first device (or, the audio source device, or encoding device) in the embodiments described in the present disclosure.

For example, the host processor 2611 of the processor 2610 of the first device 2600 may include a codec parameter manager 2612 and change time/location determiner 2613.

The codec parameter manager 2612 may maintain, update and apply a fixed or valuable codec parameters. For example, the variable codec parameter may include a codec parameter that is externally controlled or determined based on an external factor.

For example, the codec parameters may include one or more of bandwidth, bit rate, sampling rate, frame duration, frame size, data size, location, channel, number of channels, number of streams, number of streams, group, or isochronous link.

The codec parameter manager 2612 may provide the codec parameter to the controller processing unit 2615 to perform encoding on audio data based on the codec parameter and transmit the encoded audio data to the second device 2650. In addition, when the codec parameter is changed based on external control by the controller processing unit 2615, the codec parameter manager 2612 may control to seamlessly encode and transmit the first audio data to which the codec parameter before the change is applied and the second audio data to which the codec parameter after the change is applied.

When a codec parameter is changed based on an external control, the change time/location determiner 2613 may generate information related to the change time or the change location. The change time/location information may be transmitted to the second device 2650 through the controller processing unit 2615.

For example, information relating to the time or location of a change may include at least one of information on the time or location at which the codec parameter is changed, information on the time or location of audio data received by the second device based on the codec parameter before the change, or information on the time or location of data received by the second device based on the changed codec parameter.

The second device 2650 may include a processor 2660, an antenna unit 2670, transceiver 2680, and a memory 2690.

The processor 2660 may perform baseband-related signal processing and may include a host processor 2661 and a controller processor 2665. The host processor 2661 and the controller processor 2665 may exchange information through HCI. The host processor 2661 may process operations such as L2CAP, ATT, GATT, GAP, and LE profile layers. The controller processor 2665 may process operations of the LL layer, the PHY layer, and the like. The processor 2660 may control the overall operation of the second device 2660 in addition to performing baseband-related signal processing.

The antenna unit 2670 may include one or more physical antennas. The transceiver 2680 may include an RF transmitter and an RF receiver. The memory 2690 may store information processed by the processor 2660 and software, an operating system, and an application related to the operation of the second device 2650, and may include components such as a buffer and the like.

The processor 2660 of the second terminal device 2650 may be configured to implement the operation of the second device (or audio sink device, or decoding device) in the embodiments described in the present disclosure.

For example, the host processor 2661 of the processor 2660 of the second device 2650 may include a codec parameter manager 2662 and change time/location determiner 2663.

The codec parameter manager 2662 may maintain, update and apply a fixed or valuable codec parameters. For example, the variable codec parameter may include a codec parameter that is externally controlled or determined based on an external factor.

For example, the codec parameters may include one or more of bandwidth, bit rate, sampling rate, frame duration, frame size, data size, location, channel, number of channels, number of streams, number of streams, group, or isochronous link.

The codec parameter manager 2662 may provide the codec parameter to the controller processing unit 2665 to perform decoding on audio data received from the first device 2600 based on the codec parameter. In addition, when the codec parameter is changed based on external control by the controller processing unit 2615, the codec parameter manager 2612 may control to seamlessly decode and render the first audio data to which the codec parameter before the change is applied and the second audio data to which the codec parameter after the change is applied.

When a codec parameter is changed based on an external control, the change time/location determiner 2613 may determine the change time or change location of the codec parameter based on information related to the change time or change location received from the first device 2600. Based on the determined change time/location, the second device 2650 may seamlessly decode and render the first audio data to which the codec parameter before the change is applied and the second audio data to which the codec parameter after the change is applied.

For example, information relating to the time or location of a change may include at least one of information on the time or location at which the codec parameter is changed, information on the time or location of audio data received by the second device based on the codec parameter before the change, or information on the time or location of data received by the second device based on the changed codec parameter.

In the operation of the first device 2600 and the second device 2650, in the examples of the present disclosure, the descriptions of the source/encoding device and the sink/decoding device may be equally applied, and overlapping descriptions will be omitted.

Various embodiments of the present disclosure may be implemented by hardware, firmware, software, or a combination thereof. For implementation by hardware, various embodiments of the present disclosure may be implemented one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general purpose It may be implemented by a processor (general processor), a controller, a microcontroller, a microprocessor, and the like.

The scope of the present disclosure includes software or machine-executable instructions (e.g., operating system, application, firmware, program, etc.) that cause operation according to the method of various embodiments to be executed on a device or computer, and a non-transitory computer-readable medium in which such software or instructions are stored and executed on a device or computer. Instructions that may be used to program a processing system to perform the features described in this present disclosure may be stored on/in a storage medium or computer-readable storage medium, and features described in the present disclosure may be implemented using a computer program product including such the storage medium. The storage medium may include, but is not limited to, a high-speed random access memory such as DRAM, SRAM, DDR RAM or other random access solid state memory device, one or more magnetic disk storage devices, optical disk storage devices, flash memory devices, or may include non-volatile memory such as other non-volatile solid state storage devices. The memory optionally includes one or more storage devices located remotely from the processor (s).

The memory or alternatively the non-volatile memory device(s) within the memory includes a non-transitory computer-readable storage medium. Features described in this present disclosure may be stored on any one of the machine readable media to control hardware of the processing system, and it may be incorporated into software and/or firmware that allows the processing system to interact with other mechanisms that utilize results in accordance with embodiments of the present disclosure. Such software or firmware may include, but is not limited to, application codes, device drivers, operating systems, and execution environments/containers.

INDUSTRIAL APPLICABILITY

Embodiments of the present disclosure may be applied to various wireless communication systems to increase the performance of the wireless communication system.

The invention claimed is:

1. A method performed by a second device in a wireless communication system, the method comprising:
    decoding, by the second device, first data of audio data for an at least one channel based on a first codec parameter, the audio data for the at least one channel being encoded and transmitted from a first device;
    rendering, by the second device, the decoded first data for the at least one channel transmitted from the first device;
    receiving, by the second device via an external control, information signaling presence of a detected error in a specific portion in the audio data for the at least one channel transmitted from the first device, wherein the second device does not use the specific portion of the audio data for the at least one channel transmitted from the first device; and
    rendering, by the second device, second data which is substitute audio data of the specific portion of the audio data for the at least one channel transmitted from the first device, based on a second codec parameter,
    wherein the second data is generated by the second device based on the audio data for the at least one channel transmitted from the first device.

2. The method of claim 1,
wherein at least one of the first codec parameter or the second codec parameter includes an externally controlled variable codec parameter.

3. The method of claim 1, wherein the information relates to at least one of:
time, location, or frame that the codec parameter was changed,
time, location, or frame of audio data received from the first device based on a codec parameter before change, or
time, location, or frame of data received from the first device based on a codec parameter after change.

4. The method of claim 1, wherein at least one of the first codec parameter or the second codec parameter includes at least one of bandwidth, bit rate, sampling rate, frame duration, frame size, data size, location, a number of channels, stream, a number of streams, group, or isochronous link.

5. The method of claim 1, wherein the first data and the second data are seamlessly decoded.

6. A second device in a wireless communication system, the device comprising:
a transceiver for performing signal transmission and reception with another device; and
a processor for controlling the transceiver and the second device;
wherein the processor is configured to:
decode a first data of audio data for an at least one channel based on a first codec parameter, the audio data for the at least one channel being encoded and transmitted from a first device;
render the decoded first data for the at least one channel transmitted from the first device;
receive, via an external control, information signaling presence of a detected error in a specific portion in the audio data for the at least one channel transmitted from the first device, wherein the device does not use the specific portion of the audio data for the at least one channel transmitted from the first device; and
render second data which is substitute audio data of the specific portion of the audio data for the at least one channel transmitted from the first device based on a second codec parameter,
wherein the second data is generated by the second device based on the audio data for the at least one channel transmitted from the first device.

* * * * *